US012314001B2

(12) United States Patent
Sato et al.

(10) Patent No.: US 12,314,001 B2
(45) Date of Patent: May 27, 2025

(54) IMAGE FORMING APPARATUS INCLUDING LED ARRAY ATTACHED TO TOP COVER

(71) Applicant: BROTHER KOGYO KABUSHIKI KAISHA, Nagoya (JP)

(72) Inventors: Shougo Sato, Seto (JP); Atsushi Fukaya, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 51 days.

(21) Appl. No.: 18/350,047

(22) Filed: Jul. 11, 2023

(65) Prior Publication Data

US 2023/0350342 A1 Nov. 2, 2023

Related U.S. Application Data

(63) Continuation of application No. 17/592,159, filed on Feb. 3, 2022, now Pat. No. 11,726,429, which is a (Continued)

(30) Foreign Application Priority Data

Oct. 18, 2016 (JP) ................................ 2016-204512

(51) Int. Cl.
*G03G 21/18* (2006.01)
*G03G 15/08* (2006.01)
(Continued)

(52) U.S. Cl.
CPC ....... *G03G 21/186* (2013.01); *G03G 15/0879* (2013.01); *G03G 15/0891* (2013.01);
(Continued)

(58) Field of Classification Search
None
See application file for complete search history.

(56) References Cited

U.S. PATENT DOCUMENTS 7,076,192 B2 * 7/2006 Tsuda ................ G03G 15/0872 399/258
7,366,440 B2 4/2008 Horikawa
(Continued)

FOREIGN PATENT DOCUMENTS

JP 2-179663 A 7/1990
JP 2009-300859 A 12/2009
(Continued)

*Primary Examiner* — Arlene Heredia
(74) *Attorney, Agent, or Firm* — Merchant & Gould P.C.

(57) ABSTRACT

An image forming apparatus, including a casing, a toner cartridge, and a process cartridge, is provided. The toner cartridge detachably attached to the casing stores toner therein. The process cartridge detachably attached to the casing includes a developing unit and a drum unit. The developing unit includes a developer roller and a toner conveyer tube. The toner conveyer tube has a first opening, through which the toner from the toner cartridge is acceptable into the toner conveyer tube while the toner cartridge and the process cartridge are attached to the casing. The drum unit includes a photosensitive drum supporting the toner conveyer tube by contacting a circumferential surface of the toner conveyer tube. The developing unit is pivotable with respect to the drum unit with the toner conveyer tube and the drum unit being slidable on each other.

11 Claims, 15 Drawing Sheets

Related U.S. Application Data continuation of application No. 17/114,660, filed on Dec. 8, 2020, now Pat. No. 11,281,159, which is a continuation of application No. 16/701,868, filed on Dec. 3, 2019, now Pat. No. 10,884,375, which is a continuation of application No. 16/106,369, filed on Aug. 21, 2018, now Pat. No. 10,520,888, which is a continuation of application No. 15/701,153, filed on Sep. 11, 2017, now Pat. No. 10,067,468.

(51) Int. Cl.
*G03G 21/10* (2006.01)
*G03G 21/16* (2006.01)

(52) U.S. Cl.
CPC ....... *G03G 21/105* (2013.01); *G03G 21/1604* (2013.01); *G03G 21/1842* (2013.01)

(56) References Cited

U.S. PATENT DOCUMENTS

| | | | | |
|---|---|---|---|---|
| 7,853,174 | B2 | 12/2010 | Sato | |
| 7,962,063 | B2 | 6/2011 | d'Entrecasteaux | |
| 2005/0002683 | A1 | 1/2005 | Saito et al. | |
| 2007/0212118 | A1* | 9/2007 | Nagae ................ | G03G 15/0875 399/262 |
| 2012/0027459 | A1 | 2/2012 | Sato | |
| 2013/0136504 | A1 | 5/2013 | Kawashima | |
| 2013/0164033 | A1* | 6/2013 | Okabe ................ | G03G 21/1676 399/119 |
| 2014/0044450 | A1 | 2/2014 | Nakamura | |
| 2014/0050507 | A1* | 2/2014 | Hamada ............. | G03G 15/0865 222/548 |
| 2014/0161491 | A1* | 6/2014 | Fukushima ........ | G03G 21/1633 399/260 |
| 2015/0139690 | A1 | 5/2015 | Kim | |
| 2016/0109827 | A1* | 4/2016 | Yoshida ............. | G03G 15/0886 399/260 |
| 2017/0285566 | A1 | 10/2017 | Shimizu et al. | |
| 2018/0095407 | A1* | 4/2018 | Tsukada ............. | G03G 21/1628 |

FOREIGN PATENT DOCUMENTS

| | | | |
|---|---|---|---|
| JP | 2011-17939 | A | 1/2011 |
| JP | 2013-113958 | A | 6/2013 |

* cited by examiner

IMAGE FORMING APPARATUS INCLUDING LED ARRAY ATTACHED TO TOP COVER

REFERENCE TO RELATED APPLICATIONS

This application is a continuation of U.S. patent application Ser. No. 17/592,159, filed Feb. 3, 2022, which is a continuation of U.S. patent application Ser. No. 17/114,660, filed Dec. 8, 2020, which is a continuation of Ser. No. 16/701,868, filed Dec. 3, 2019, which is a continuation of U.S. patent application Ser. No. 16/106,369, filed Aug. 21, 2018, which is a continuation of U.S. patent application Ser. No. 15/701,153, filed Sep. 11, 2017, which further claims priority under 35 U.S.C. § 119 from Japanese Patent Application No. 2016-204512, filed on Oct. 18, 2016. The entire subject matter of the aforementioned applications are incorporated herein by reference.

BACKGROUND ART

Technical Field

The following disclosure is related to an aspect of an image forming apparatus and a process cartridge.

Background

An image forming apparatus, including a drum unit, a developing unit, and a toner cartridge, is known. The drum unit may include a photosensitive drum. The developing unit may include a developer roller, which may supply toner to the photosensitive drum. The toner cartridge may contain the toner to be supplied to the developing unit.

The image forming apparatus may be configured such that the developer roller is movable with respect to the photosensitive drum. The developer roller movable to the photosensitive drum may be advantageous in various aspects. For example, while the developer roller may need to contact the photosensitive drum, or the developer roller may need to maintain a predetermined preferable distance from the photosensitive drum, the developer roller movable to the photosensitive drum may maintain a preferable amount of contact pressure against the photosensitive drum or may maintain the preferable distance from the photosensitive drum as the photosensitive drum may behave eccentrically. For another example, while the developer roller is movable with respect to the photosensitive drum, the developer roller may be separated from the photosensitive drum to enable easier replacement of the drum unit or the developing unit.

DESCRIPTION

Summary

The developing unit may be configured such that the developer roller is movable to pivot between a position, in which the developer roller contacts the photosensitive drum, and a position, in which the developer roller is separated from the photosensitive drum. In other words, the developing unit together with the developer roller may be movable with respect to the photosensitive drum. The developing unit may be coupled to the toner cartridge through a pipe, which is bendable in accordance with the pivot movement of the developing unit.

In other words, in order to allow the developing unit to move with respect to the photosensitive drum, and in order to couple the developing unit with the toner cartridge, a bendable pipe may be required. In this regard, it may be difficult to reduce complexity of the coupling structure between the developing unit and the toner cartridge.

The present disclosure is advantageous in that an image forming apparatus and a process cartridge, in which the developing unit is movable with respect to the photosensitive drum, and the developing unit and the toner cartridge are coupled with each other stably so that leakage of toner may be prevented, are provided in a less complicated configuration.

According to an aspect of the present disclosure, an image forming apparatus, including a casing; a toner cartridge configured to be detachably attached to the casing, the toner cartridge being configured to store toner therein; and a process cartridge configured to be detachably attached to the casing, is provided. The process cartridge includes a developing unit and a drum unit. The developing unit includes a developer roller, and a toner conveyer tube for conveying the toner from the toner cartridge toward the developer roller. The toner conveyer tube has a first opening, through which the toner from the toner cartridge is acceptable into the toner conveyer tube while the toner cartridge and the process cartridge are attached to the casing. The drum unit includes a photosensitive drum configured to support the toner conveyer tube by contacting a circumferential surface of the toner conveyer tube. While the circumferential surface of the toner conveyer tube contacts the drum unit, the developing unit is pivotable with respect to the drum unit with the toner conveyer tube and the drum unit being slidable on each other.

According to another aspect of the present disclosure, a process cartridge, including a developing unit and a drum unit, is provided. The developing unit includes a developer roller and a toner conveyer tube for conveying toner toward the developer roller. The toner conveyer tube has a first opening, through which the toner is acceptable into the toner conveyer tube. The drum unit includes a photosensitive drum configured to support the toner conveyer tube by contacting a circumferential surface of the toner conveyer tube. While the circumferential surface of the toner conveyer tube contacts the drum unit, the developing unit is pivotable with respect to the drum unit with the toner conveyer tube and the drum unit being slidable on each other.

EMBODIMENT

1. Overall Configuration of Image Forming Apparatus

Figure 1:
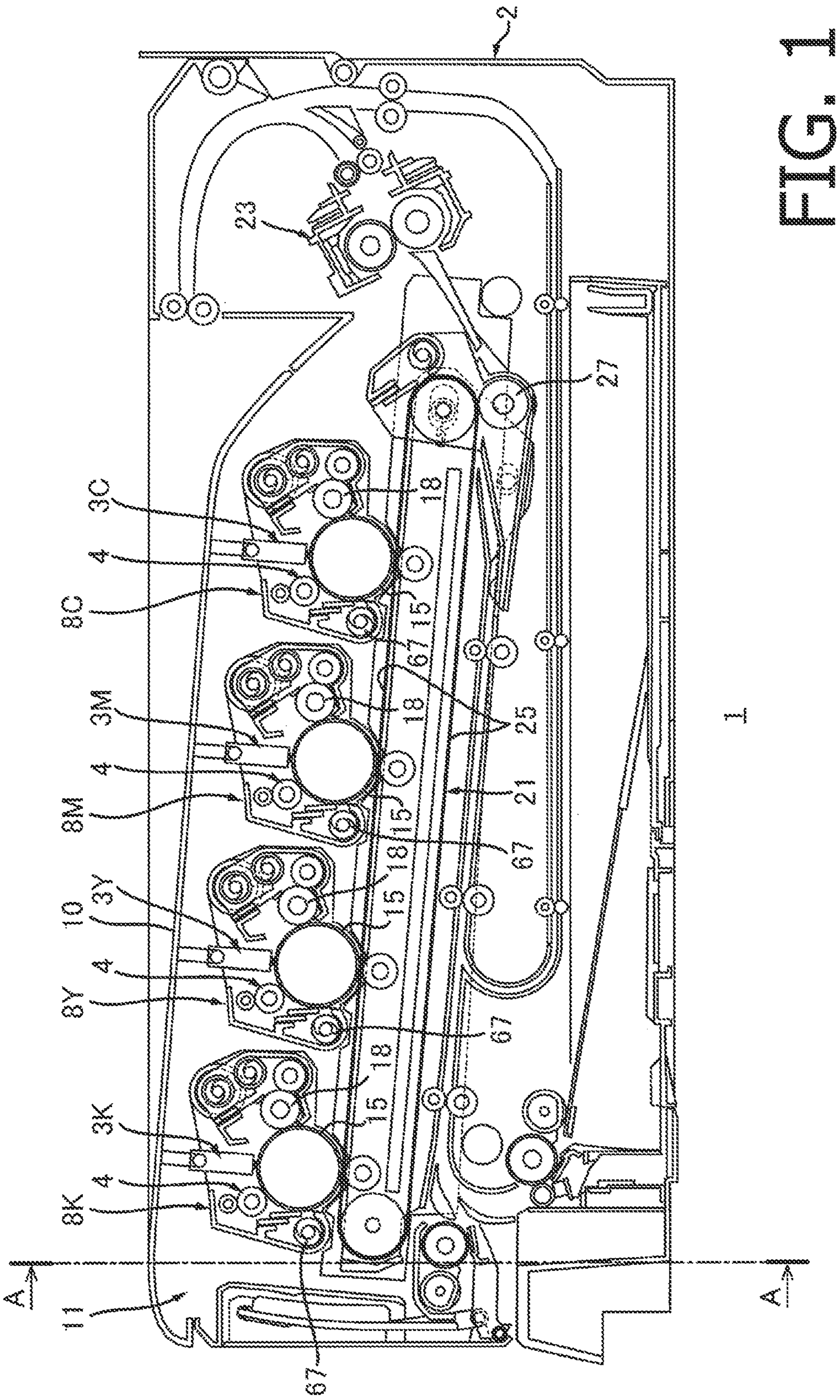
FIG. 1 is a cross-sectional view of an image forming apparatus according to an embodiment of the present disclosure.

An overall configuration of an image forming apparatus 1 according to an embodiment of the present disclosure will be described with reference to FIGS. 1, 2, 8, and 10. As shown in FIG. 1, the image forming apparatus 1 includes a main casing 2, a plurality of, e.g., four (4), process cartridges 8K, 8Y, 8M, 8C, a plurality of, e.g., four (4), toner cartridges 9K, 9Y, 9M, 9C (see FIG. 10), and a plurality of, e.g., four (4), LED arrays 3K, 3Y, 3M, 3C. The toner cartridges 9K, 9Y, 9M, 9C may contain toners in different colors, e.g., black, yellow, magenta, and cyan, respectively, therein. The process cartridges 8K, 8Y, 8M, 8C may form toner images in the toners in the different colors supplied from the toner cartridges 9K, 9Y, 9M, 9C, respectively.

1.1 Main Casing

The main casing 2 forms an outline of the image forming apparatus 1. The main casing 2 may accommodate the process cartridges 8K, 8Y, 8M, 8C and the toner cartridges 9K therein.

1.2 Process Cartridges

Figure 2:
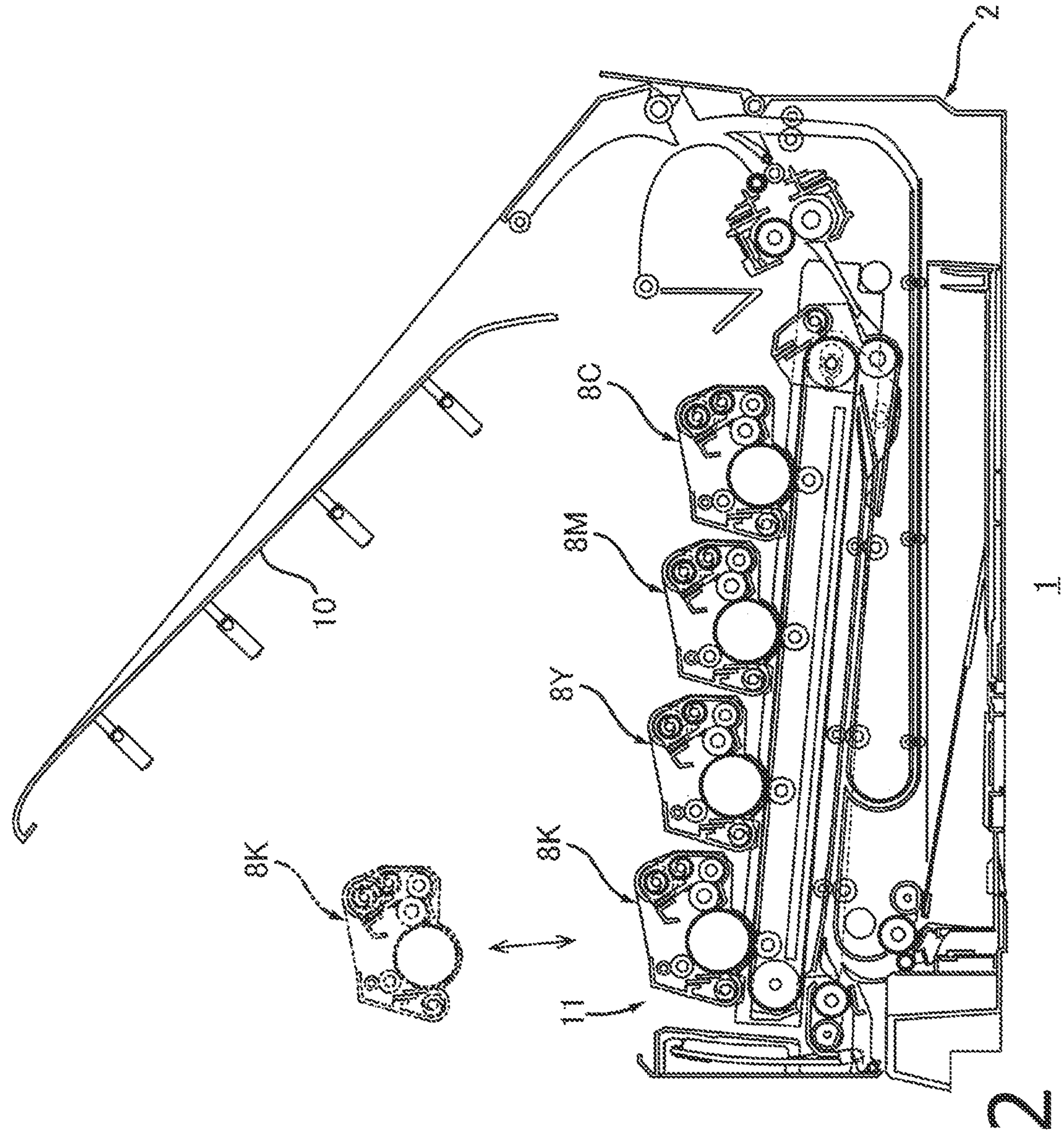
FIG. 2 is a cross-sectional view of the image forming apparatus with detachably attachable process cartridges according to the embodiment of the present disclosure.

The process cartridges 8K, 8Y, 8M, 8C are, as shown in FIGS. 1 and 2, arranged to align along a predetermined direction. In the following description, the direction along which the process cartridges 8K, 8Y, 8M, 8C align will be defined as an aligning direction. The process cartridges 8K, 8Y, 8M, 8C are spaced apart from one another along the aligning direction. The process cartridges 8K, 8Y, 8M, 8C are attachable to and detachable from the main casing 2 through an opening 11, which the main casing 2 has, along a first direction. The first direction intersects with the aligning direction and with an axial direction of developer rollers 18 (see FIG. 4), which will be described later in detail. In particular, the first direction may intersect orthogonally with the aligning direction and with the axial direction of the developer rollers 18. The first direction may be, for example, a vertical direction. Therefore, the process cartridges 8K, 8Y, 8M, 8C are detachably attachable to the main casing 2 along the direction intersecting orthogonally with the axial direction of the developer rollers 18. The axial direction is a direction along which axes of the developer rollers 18 extend.

The opening 11 is located at one side of the process cartridges 8K, 8Y, 8M, 8C with regard to the first direction. In particular, the opening 11 is located at a position downstream from the process cartridges 8K, 8Y, 8M, 8C along a direction, in which the process cartridges 8K, 8Y, 8M, 8C may be detached from the main casing 2. The opening 11 is located at an upper position with respect to the process cartridges 8K, 8Y, 8M, 8C. The opening 11 may be exposed open or closed by a top cover 10. The top cover 10 is movable between an open position (see FIG. 2), in which the top cover 10 opens the opening 11, and a closure position (see FIG. 1), in which the top cover 10 closes the opening 10.

1.3 Toner Cartridges

Figure 8:
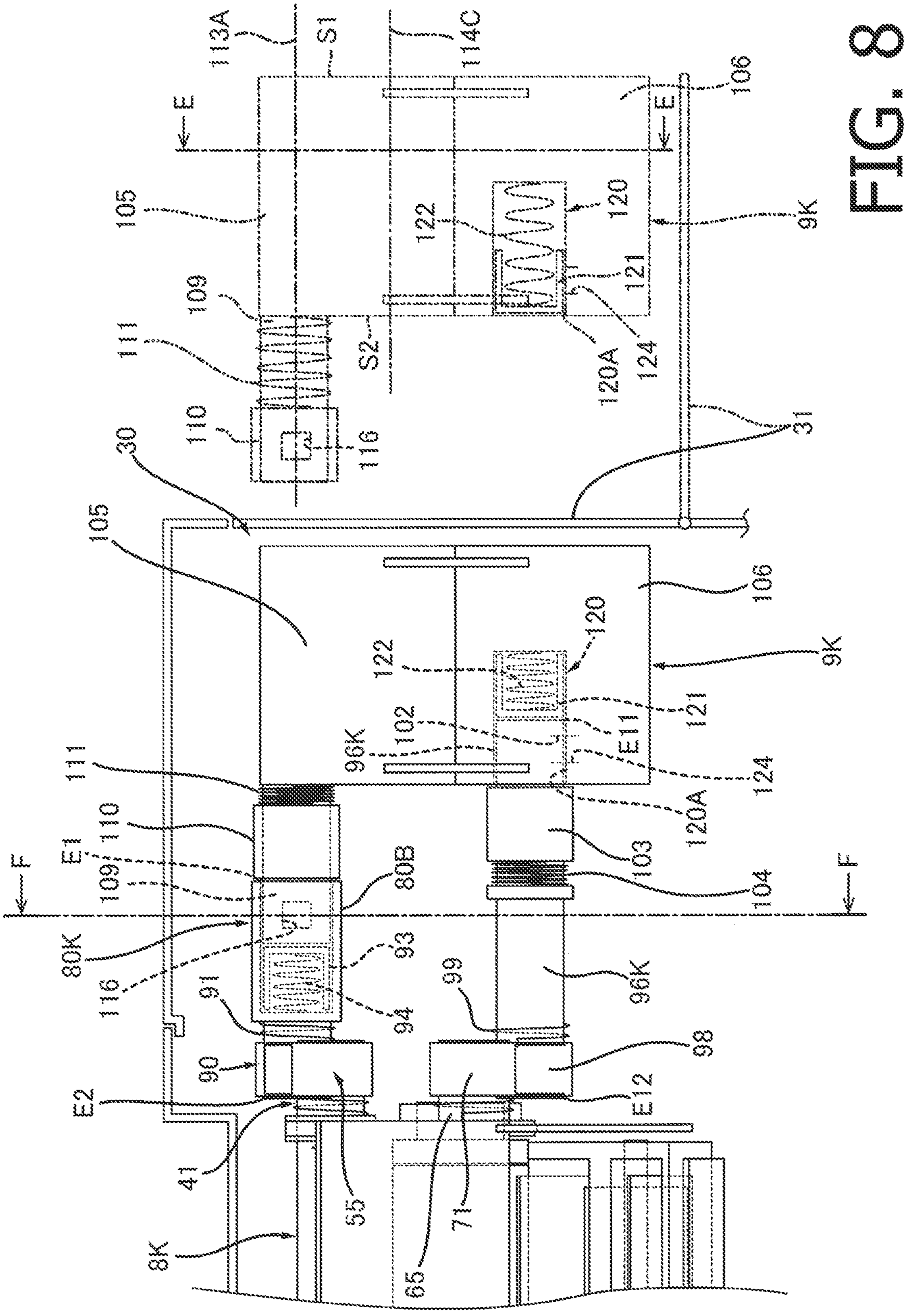
FIG. 8 is a cross-sectional view of the image forming apparatus according to the embodiment of the present disclosure viewed at a line A-A shown in FIG. 1.
Figure 10:
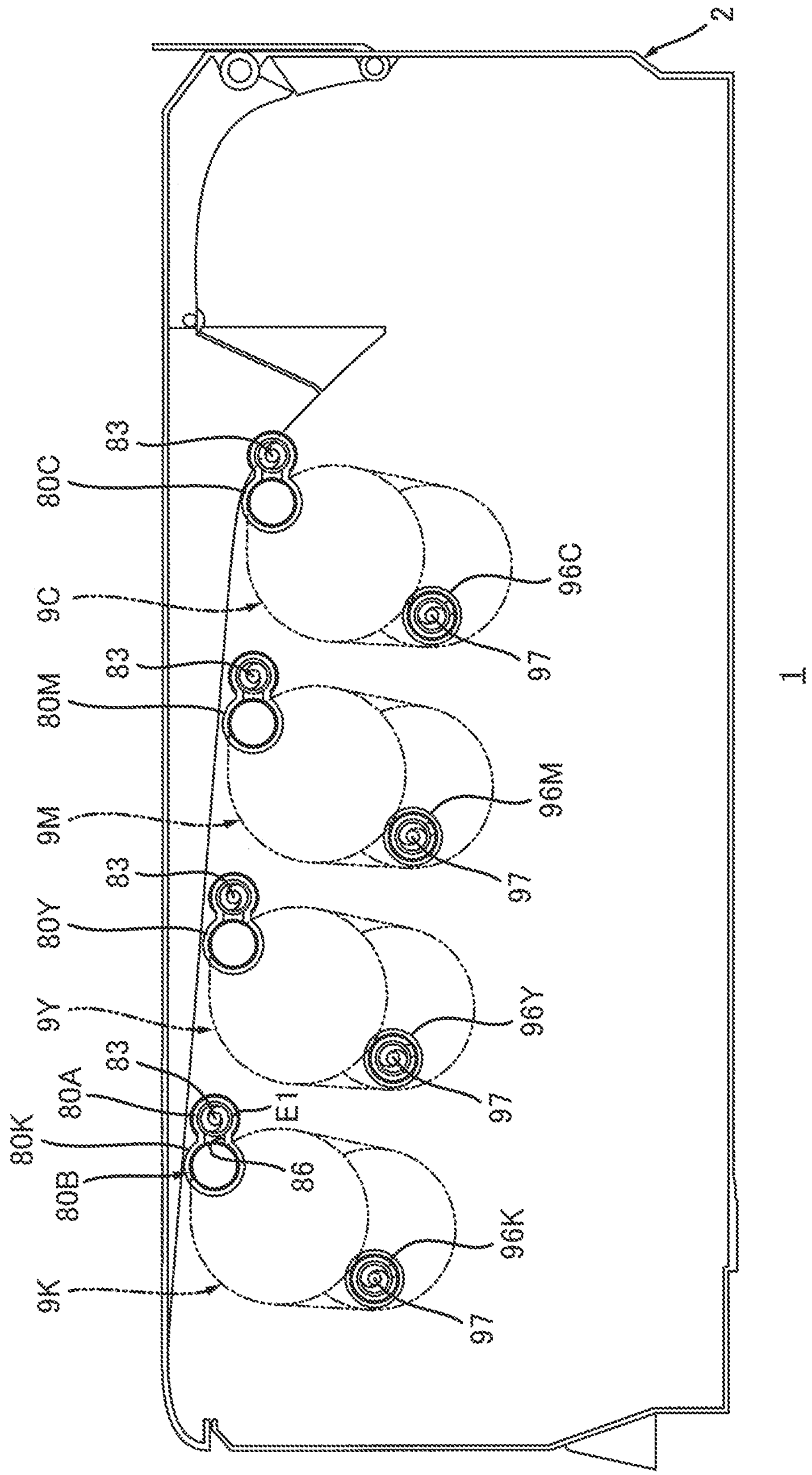
FIG. 10 is a cross-sectional view of the image forming apparatus with the toner cartridges according to the embodiment of the present disclosure viewed at a line F-F shown in FIG. 8.

The toner cartridges 9K, 9Y, 9M, 9C, as shown in FIGS. 8 and 10, align along the aligning direction spaced apart from one another along the aligning direction. The toner cartridges 9K, 9Y, 9M, 9C are located at one side of the process cartridges 8K, 8Y, 8M, 8C, respectively, with regard to the axial direction. While the toner cartridge 9K and the process cartridge 8K are attached to the main casing 2, the toner cartridge 9K and the process cartridge 8K align along the axial direction of the developer rollers 18. Similarly, while the toner cartridge 9Y and the process cartridge 8Y, the toner cartridge 9M and the process cartridge 8M, and the toner cartridge 9C and the process cartridge 8C are attached to the main casing 2, respectively, the toner cartridge 9Y and the process cartridge 8Y, the toner cartridge 9M and the process cartridge 8M, and the process cartridge 8C and the toner cartridge 8C align respectively along the axial direction of the developer rollers 18. The toner cartridges 9K, 9Y, 9M, 9C are attachable to and detachable from the main casing 2 through an opening 30, which the main casing 2 has, along a second direction. The second direction is a direction different from the first direction and may be parallel with the axial direction. Therefore, the process cartridges 8K, 8Y, 8M, 8C are detachably attachable to the main casing 2 along a direction parallel with the axial direction. Meanwhile, the second direction may not necessarily be parallel with the axial direction but may incline with respect to the axial direction. The second direction intersects with the aligning direction and with the first direction. For example, the second direction may intersect orthogonally with the aligning direction and with the first direction.

The opening 30 is located at one side of the toner cartridges 9K, 9Y, 9M, 9C with regard to the second direction. In particular, the opening 30 is located at a position downstream from the toner cartridges 9K, 9Y, 9M, 9C along a direction, in which the toner cartridges 9K, 9Y, 9M, 9C may be detached from the main casing 2. The opening 30 may be exposed open or closed by a side cover 31. The side cover 31 is movable between an open position, in which the side cover 31 opens the opening 30, and a closure position, in which side cover 31 closes the opening 30.

1.4 LED Arrays

The LED arrays 3K, 3Y, 3M, 3C are, as shown in FIGS. 1 and 2, attached to the top cover 10. The LED arrays 3K, 3Y, 3M, 3C may expose the process cartridges 8K, 8Y, 8M, 8C to light, respectively.

1.5 Intermediate Transfer Unit, Transfer Roller, and Fuser

The image forming apparatus 1 further includes, as shown in FIG. 1, an intermediate transfer unit 21, a transfer roller 27, and a fuser 23. The intermediate transfer unit 21 is located at a side of the process cartridges 8K, 8Y, 8M, 8C opposite to the opening 11 with regard to the first direction. The intermediate transfer unit 21 is located at a lower position with respect to the process cartridges 8K, 8Y, 8M, 8C. The intermediate transfer unit 21 includes an intermediate transfer belt 25. The intermediate transfer unit 21 may transfer toner images formed on photosensitive drums 15 in the process cartridges 8K, 8Y, 8M, 8C to the intermediate transfer belt 25. The intermediate transfer belt 25 is arranged to contact the process cartridges 8K, 8Y, 8M, 8C. The transfer roller 27 may transfer the toner images on the intermediate transfer belt 25 to a sheet. The transfer roller 27 is arranged to contact the intermediate transfer belt 27. The fuser 23 may apply heat and pressure to the sheet, onto which the toner images are transferred, so that the toner images may be fused and fixed on the sheet.

2. Detailed Configuration of the Process Cartridges

Next, a detailed configuration of the process cartridge 8K will be described. The process cartridges 8K, 8Y, 8M, 8C are in a same structure; therefore, in the following description, the process cartridge 8K will represent the structure of the process cartridges 8K, 8Y, 8M, 8C, and description of the process cartridges 8Y, 8M, 8C may be omitted.

Figure 3:
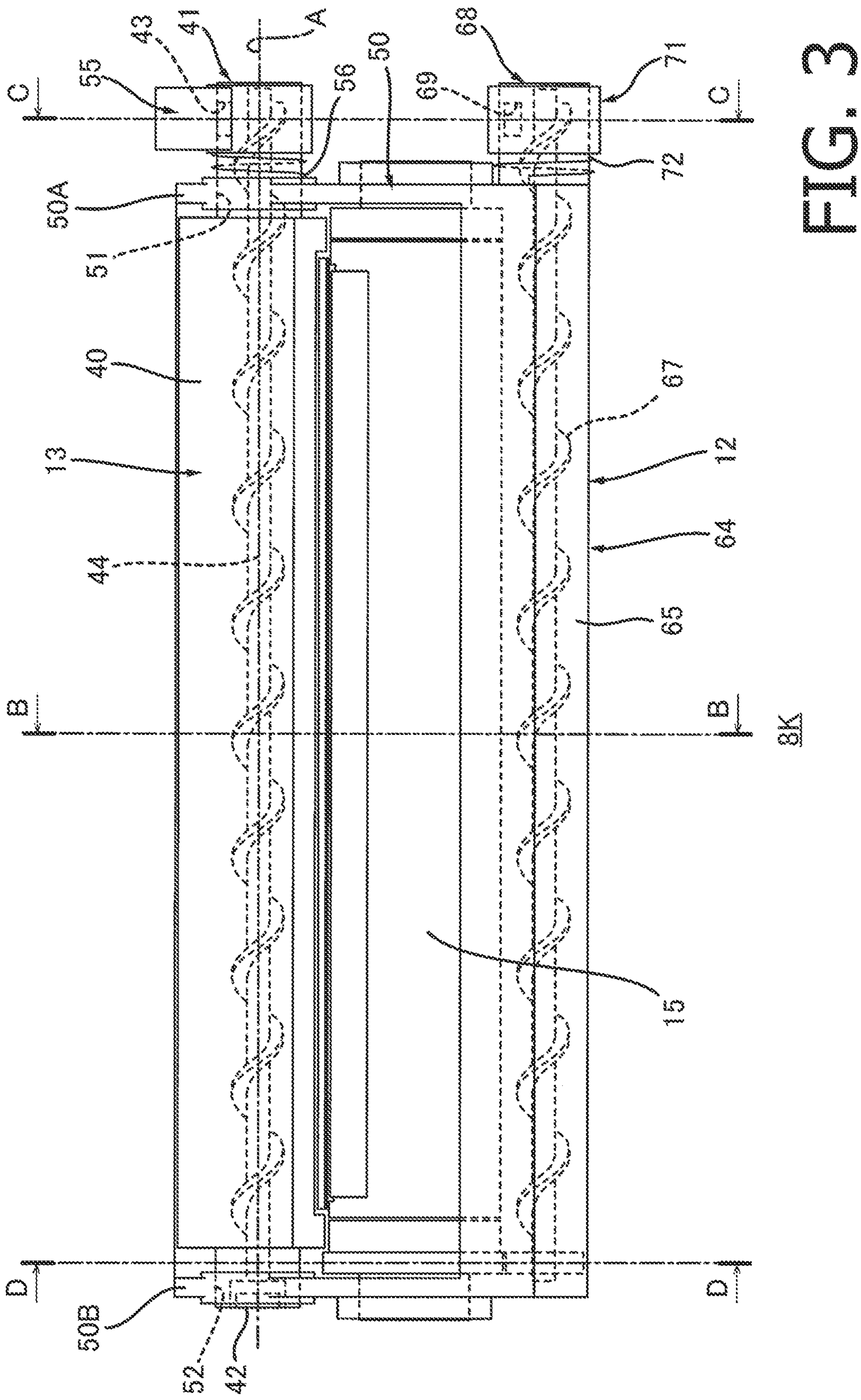
FIG. 3 is a plan view of one of the process cartridges in the image forming apparatus according to the embodiment of the present disclosure.
Figure 4:
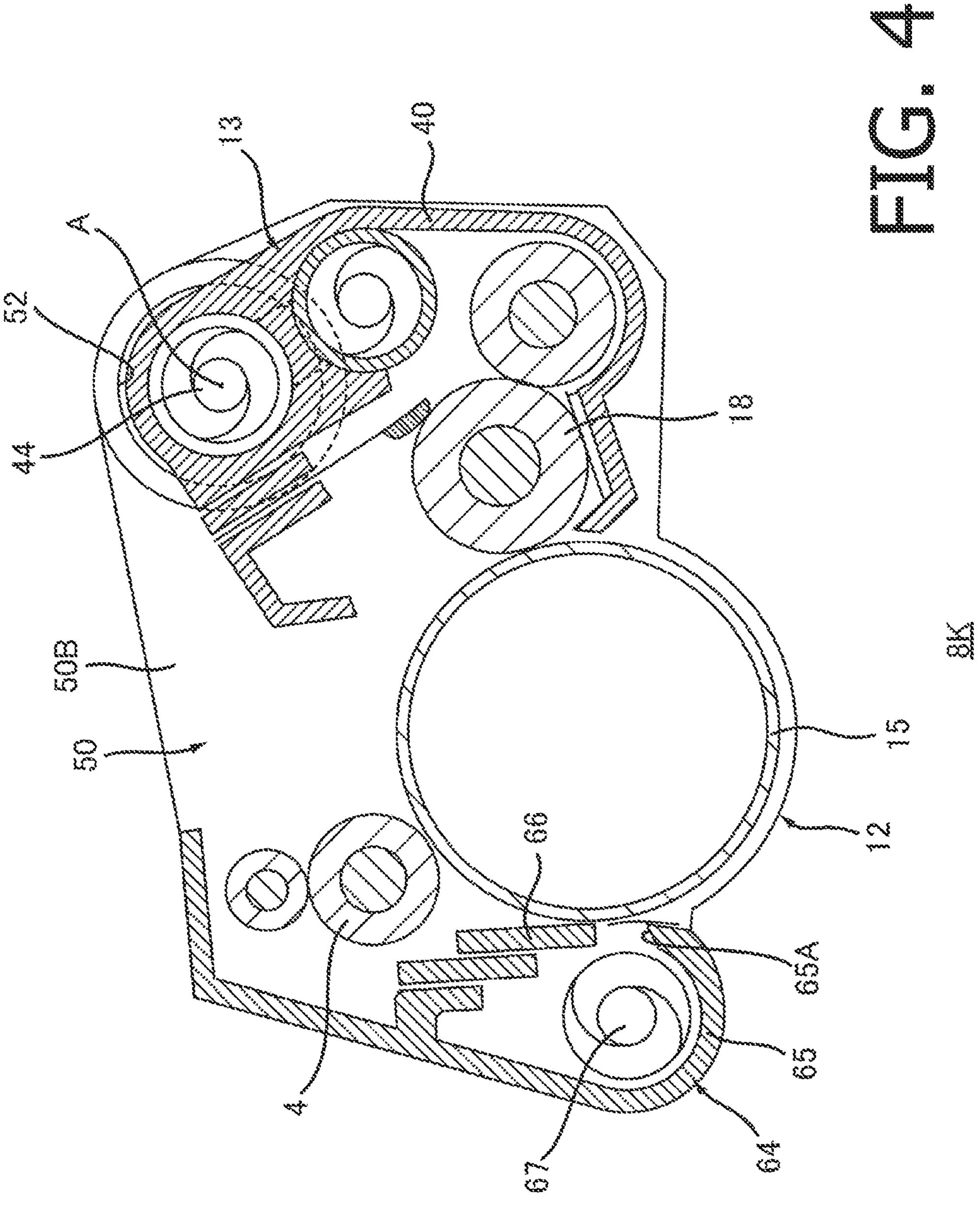
FIG. 4 is a cross-sectional view of the process cartridge according to the embodiment of the present disclosure viewed at a line B-B shown in FIG. 3.

The process cartridge 8K includes, as shown in FIGS. 3 and 4, a drum unit 12 and a developing unit 13.

2.1 Drum Unit

The drum unit 12 includes the photosensitive drum 15, a charger roller 4, a drum frame 50, and a cleaner 64.

The photosensitive drum 15 is rotatable about an axis that extends along the axial direction.

The charger roller 4 may electrically charge the circumferential surface of the photosensitive drum 15. The charger roller 4 is arranged to contact the circumferential surface of the photosensitive drum 15. The circumferential surface of the photosensitive drum 15 having been charged by the charger roller 4 may be exposed to light from the LED array 3K so that an electrostatic latent image may be formed on the circumferential surface of the photosensitive drum 15.

The drum frame 50 supports the photosensitive drum 15, the developing unit 13, and the cleaner 64. The drum frame 50 includes a first wall 50A and a second wall 50B. The first wall 50A and the second wall 50B are spaced apart along the axial direction from each other. The first wall 50A supports one end of the photosensitive drum 15 with regard to the axial direction, and the second wall 50B supports the other end of the photosensitive drum 15 with regard to the axial direction. Thus, the drum frame 50 supports the photosensitive drum 15 rotatably. The first wall 50A has an insertion hole 51. In other words, the drum frame 50 has the insertion hole 51. The insertion hole 51 is a through-hole formed through the first wall 50A along the axial direction. In the insertion hole 51, inserted is a toner conveyer tube 41, which will be described later in detail, in the developing unit 13. The second wall 50B has an insertion hole 52. The insertion hole 52 is a through-hole formed through the second wall 50B along the axial direction. In the insertion hole 52, inserted is a protrusive part 42 of the developing unit 13, which will be described later in detail.

The cleaner 64 may collect the toner from the circumferential surface of the photosensitive drum 15 to clean the circumferential surface of the photosensitive drum 15. The cleaner 64 includes a blade 66, a cleaner frame 65, a waste toner conveyer tube 68, a cleaner shutter 71, and an auger 67.

The blade 66 may scrape the toner off from the circumferential surface of the photosensitive drum 15. The blade 66 has a shape of a plate elongated in the axial direction. The blade 66 is arranged to contact the photosensitive drum 15 at an edge thereof. In the following description, the toner scraped off from the circumferential surface of the photosensitive drum 15 by the blade 66 will be referred to as waste toner.

The cleaner frame 65 may accommodate the waste toner therein. The cleaner frame 65 extends in the axial direction and includes one end portion and the other end portion along the axial direction. The one end portion of the cleaner frame 65 is connected to the first wall 50A, and the other end portion of the cleaner frame 65 is connected to the second wall 50B. Thus, the cleaner 64 is supported by the drum frame 50. The cleaner frame 65 has an opening 65A, through which the waste toner from the circumferential surface of the photosensitive drum 15 may be accepted.

The waste toner conveyer tube 68 is, in conjunction with the auger 67, for conveying the waste toner in the cleaner frame 65. The waste toner conveyer tube 68 is located at a side of the one end portion of the cleaner frame 65. The waste toner conveyer tube 68 protrudes outward from the one end portion of the cleaner frame 65 in the axial direction to extend in the axial direction. The waste toner conveyer tube 68 has an opening 69, which may allow the waste toner to be discharged outside the waste toner conveyer tube 68. The opening 69 is located at a position on a side of the first wall 50A opposite to the photosensitive drum 15 along the axial direction.

Figure 5:
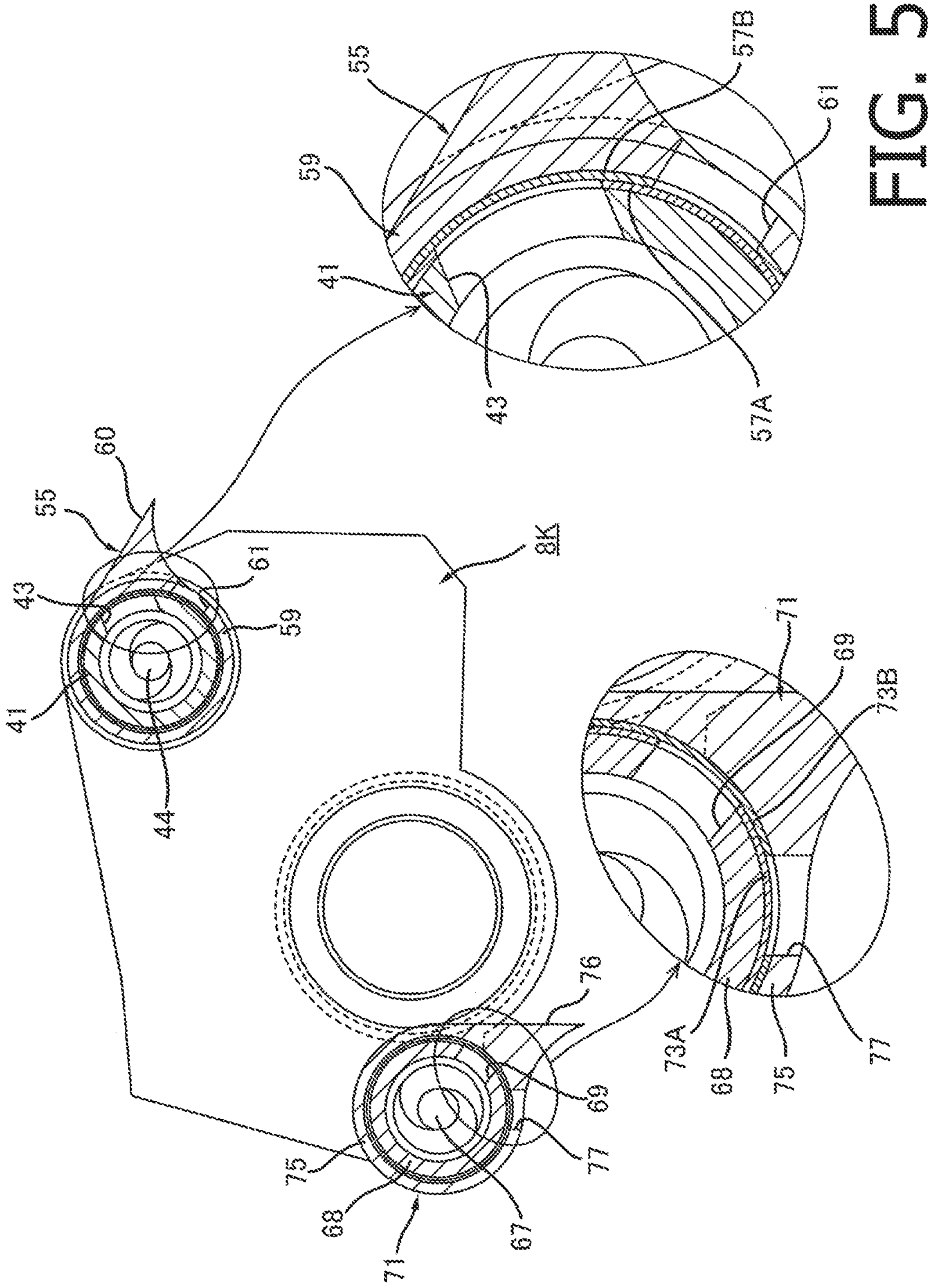
FIG. 5 is a cross-sectional view of the process cartridge according to the embodiment of the present disclosure viewed at a line C-C shown in FIG. 3.
Figure 6:
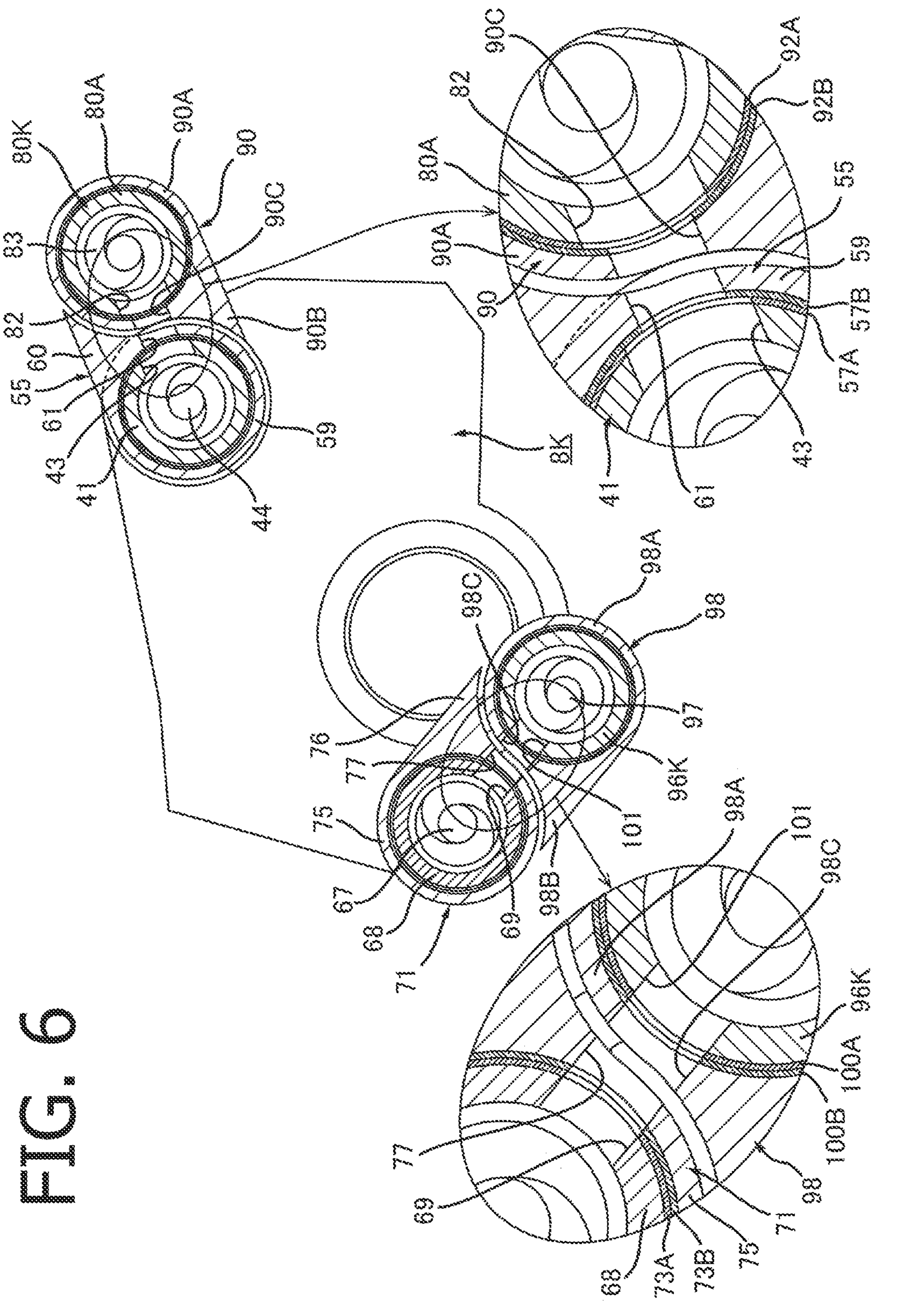
FIG. 6 is an illustrative view of the process cartridge being attached to a main casing in the image forming apparatus according to the embodiment of the present disclosure.

The cleaner shutter 71, as shown in FIGS. 5 and 6, may open and close the opening 69. The cleaner shutter 71 is movable to rotate between a closure position (see FIG. 5), in which the cleaner shutter 71 closes the opening 69, and an open position (see FIG. 6), in which the cleaner shutter 71 opens the opening 69.

In particular, the cleaner shutter 71 covers an outer circumferential surface of the waste toner conveyer tube 68 and is movable to rotate on the circumferential surface of the waste toner conveyer tube 68 between the open position and the closure position. The cleaner shutter 71 is urged by a spring 72 (see FIG. 3) toward the closure position. Therefore, the cleaner shutter 71 may be located at the closure position while the process cartridge 8K is separated from the main casing 2. The cleaner shutter 71 includes a main part 75 and a protrusive part 76. The main part 75 covers the circumferential surface of the waste toner conveyer tube 68. The main part 75 has a cylindrical shape and extends in the axial direction. The main part 75 has an opening 77. The opening 77 at least partly coincides with the opening 69 to be continuous with the opening 69 while the cleaner shutter 71 is at the open position. On the other hand, the opening 77 is displaced from the opening 69 to be not continuous with the opening 69 while the cleaner shutter 71 is at the closure position. The protrusive part 76 may contact a main part 98A of a shutter 98, which will be described later in detail, in the image forming apparatus 1 while the process cartridge 8K is attached to the image forming apparatus 1. The protrusive part 76 protrudes outward in a radial direction of the main part 78 from a circumferential surface of the main part 75. When the process cartridge 8K is being attached to the main casing 2, the protrusive part 76 contacting the main part 98A of the shutter 98 may move the cleaner shutter 71 from the closure position to the open position. Thus, the cleaner shutter 71 is placed in the open position while the process cartridge 8K is attached to the main casing 2. Meanwhile, at a position between the waste toner conveyer tube 68 and the cleaner shutter 71, arranged are a sealer 73A and a sealer 73B. The sealer 73A and the sealer 73B may seal a gap between the waste toner conveyer tube 68 and the cleaner shutter 71. The sealer 73A is arranged to contact the circumferential surface of the waste toner conveyer tube 68 and may be adhered thereto by, for example, an adhesive agent. The sealer 73A encloses the opening 69. Meanwhile, the sealer 73B is arranged to contact an inner circumferential surface of the main part 75 and may be adhered to the inner circumferential surface of the main part 75 by, for example, an adhesive agent. The sealer 73B encloses the opening 77. The sealer 73B contacts the sealer 73A and is slidable with respect to the sealer 73A along a rotating direction of the cleaner shutter 71.

The auger 67, as shown in FIGS. 3 and 4, may convey the waste toner in the cleaner frame 65 toward the opening 69. The auger 67 is arranged in the cleaner frame 65 and in the waste toner conveyer tube 68. The auger 67 extends in the axial direction.

2.2 Developing Unit

The developing unit 13 may supply the toner to the circumferential surface of the photosensitive drum 15 to develop the electrostatic latent image to a toner image. The developing unit 13 includes the developer roller 18, a developer frame 40, the toner conveyer tube 41, a first shutter 55, an auger 44, and a protrusive part 42.

The developer roller 18 is rotatable about the axis that extends in the axial direction. The developer roller 18 is arranged to contact the photosensitive drum 15.

The developer frame 40 may accommodate the toner therein. The developer frame 40 extends in the axial direction. The developer frame 40 supports the developer roller 18 rotatably. The developer frame 40 is located between the first wall 50A and the second wall 50B along the axial direction.

The toner conveyer tube 41 is for conveying the toner from the toner cartridge 9K toward the developer roller 18. The toner conveyer tube 41 is located at a side of an outer surface of the developer frame 40 at one end of the developer frame 40 with regard to the axial direction. The toner conveyer tube 41 protrudes outward from the outer surface of the developer frame 40. In other words, a portion of the toner conveyer tube 41 protrudes outward from the outer surface of the developer frame 40. The toner conveyer tube 41 extends in the axial direction.

In particular, the toner conveyer tube 41 extends in the axial direction along a rotation axis A of the auger 44. The toner conveyer tube 41 has a cylindrical shape. An inner tubular room inside the toner conveyer tube 41 is continuous with an inner room inside the developer frame 40. The toner conveyer tube 41 is inserted through the insertion hole 51 in the first wall 50A. In this regard, while the toner conveyer tube 41 is inserted through the insertion hole 51, an inner circumferential surface of the insertion hole 51 surrounds a portion of an outer circumferential surface of the toner conveyer tube 41. Therefore, while the toner conveyer tube 41 is inserted through the insertion hole 51, the first wall 50A of the drum unit 12 surrounds the portion of the outer circumferential surface of the toner conveyer tube 41. In other words, the drum unit 12 surrounds the circumferential surface of the toner conveyer tube partially. While the toner conveyer tube 41 is inserted through the insertion hole 51, part of the outer circumferential surface of the toner conveyer tube 41 contacts the inner circumferential surface of the insertion hole 51. Thus, the drum unit 12 may support the toner conveyer tube 41 by the contact between the inner circumferential surface of the insertion hole 51 and the outer circumferential surface of the toner conveyer tube 41. The toner conveyer tube 41 has a first opening 43, through which the toner from the toner cartridge 9K is acceptable into the toner conveyer tube 41 while the process cartridge 8K and the toner cartridge 9K are attached to the main casing 2. The first opening 43 is formed through the circumferential surface of the toner conveyer tube 41. The first opening 43 is located at a position on the side of the first wall 50A opposite to the developer frame 40 with regard to the axial direction. Meanwhile, the first opening 43 is located at a position on one side of the insertion hole 51 opposite to the developer frame 40 with regard to the axial direction. In other words, the insertion hole 51 is located between the first opening 43 and the developer frame 40 along the axial direction.

The first shutter 55, as shown in FIGS. 5 and 6, may open and close the first opening 43. The first shutter 55 is movable to rotate between a closure position (see FIG. 5), in which the first shutter 55 closes the first opening 43, and an open position (see FIG. 6), in which the first shutter 55 opens the first opening 43.

In particular, the first shutter 55 covers the outer circumferential surface of the toner conveyer tube 41 and is movable to rotate on the circumferential surface of the toner conveyer tube 41 between the open position and the closure position. The first shutter 55 is urged by a first spring 56 (see FIG. 3) toward the closure position. Therefore, the first shutter 55 tends to be located at the closure position while the process cartridge 8K is separated from the image forming apparatus 1. The first shutter 55 includes a main part 59 and a protrusive part 60. The main part 59 covers the circumferential surface of the toner conveyer tube 41. The main part 59 has a cylindrical shape and extends in the axial direction. The main part 59 has an opening 61. The opening 61 is formed through a circumferential surface of the main part 59. The opening 61 at least partly coincides with the first opening 43 to be continuous with the first opening 43 while the first shutter 55 is at the open position. On the other hand, the opening 61 is displaced from the first opening 43 to be not continuous with the first opening 43 while the first shutter 55 is at the closure position. A dimension of the opening 61 along a circumferential direction of the main part 59 is smaller than a dimension of the first opening 43 along a circumferential direction of the toner conveyer tube 41. The protrusive part 60 may contact a main part 90A of a second shutter 90, which will be described later in detail, in the image forming apparatus 1 while the process cartridge 8K is attached to the image forming apparatus 1. The protrusive part 60 protrudes outward in a radial direction of the main part 59 from the circumferential surface of the main part 59. When the process cartridge 8K is being attached to the main casing 2, the protrusive part 60 contacting the main part 90A of the second shutter 90 may move the first shutter 55 from the closure position to the open position. Thus, the first shutter 55 is placed in the open position while the process cartridge 8K is attached to the image forming apparatus 1. Meanwhile, at a position between the toner conveyer tube 41 and the first shutter 55, arranged are a first sealer 57A and a first sealer 57B. In this regard, the developing unit 13 includes the first sealer 57A and the first sealer 57B. The first sealer 57A and the first sealer 57B may seal a gap between the toner conveyer tube 41 and the first shutter 55. The first sealer 57A is arranged to contact the circumferential surface of the toner conveyer tube 41 and may be adhered thereto by, for example, an adhesive agent. The first sealer 57A encloses the first opening 43. Meanwhile, the first sealer 57B is arranged to contact an inner circumferential surface of the main part 59 and may be adhered to the inner circumferential surface of the main part 59 by, for example, an adhesive agent. The first sealer 57B encloses the opening 61. The first sealer 57B contacts the first sealer 57A and is slidable with respect to the first sealer 57A in a rotating direction of the first shutter 55.

The auger 44, as shown in FIGS. 3 and 4, may convey the toner in the toner conveyer tube 41 toward the developer roller 18. In particular, the auger 44 may convey the toner accepted in the toner conveyer tube 41 toward the developer frame 40. The toner conveyed to the developer frame 40 may be supplied to the developer roller 18. The auger 44 is arranged in the developer frame 40 and in the toner conveyer tube 41. The auger 44 extends in the axial direction and includes one end portion and the other end portion with regard to the axial direction. The auger 44 is supported by the toner conveyer tube 41 at the one end portion and by the protrusive portion 42 of the developer unit 13 at the other end portion. The protrusive portion 42 is located at a side of an outer surface of the developer frame 40 on the other end opposite to the toner conveyer tube 41 with regard to axial direction. The protrusive portion 42 protrudes outward in the axial direction from the outer surface on the other end of the developer frame 40. The protrusive part 42 extends in the axial direction, in particular, along a rotation axis A of the auger 44. The protrusive part 42 has a cylindrical shape. The protrusive part 42 is inserted through the insertion hole 52 in the second wall 50B.

Thus, with the toner conveyer tube 41 inserted through the insertion hole 51 in the first wall 50A, and with the protrusive portion 42 inserted through the insertion hole 52 in the second wall 50B, the developer unit 13 is supported pivotably with respect to the drum unit 2. While the circumferential surface of the toner conveyer tube 41 stays contacting the drum frame 50 of the drum unit 12, the toner conveyer tube 41 and the drum unit 12 slidable on each other allow the developing unit 13 to pivot with respect to the drum unit 12. In other words, while the circumferential surface of the toner conveyer tube 41 stays contacting the inner surface of the insertion hole 51, the circumferential surface of the toner conveyer tube 41 and the inner surface of the insertion hole 51 may slide on each other so that the developer unit 13 is enabled to pivot with respect to the drum unit 12. The developing unit 13 is pivotable with respect to the drum unit 12 about the rotation axis A of the auger 44. Therefore, the drum unit 12 supports the toner conveyer tube 41 such that the developing unit 13 is enabled to pivot about the rotation axis A of the auger 44.

As the developing unit 13 pivots with respect to the drum unit 12, the outer circumferential surface of the protrusive part 42 and the inner surface of the insertion hole 52 contact each other and slide to each other.

Figure 7:
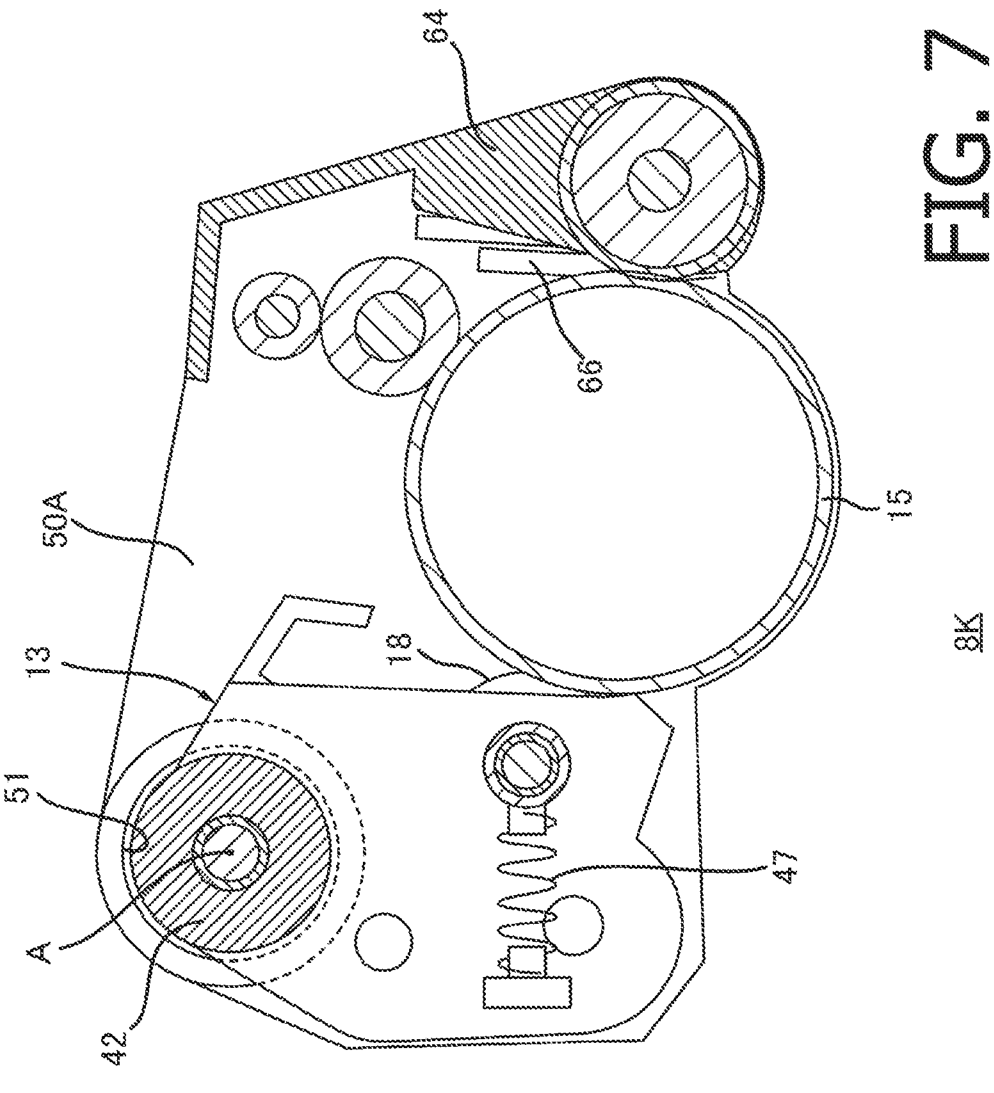
FIG. 7 is a cross-sectional view of the process cartridge according to the embodiment of the present disclosure viewed at a line D-D shown in FIG. 3.

Meanwhile, the developing unit 13 is, in a normal condition, as shown in FIG. 7, urged by a spring 47 in a direction, in which the developer roller 18 tends to contact against the photosensitive drum 15.

3. Detailed Configuration of the Toner Cartridge

Figure 9:
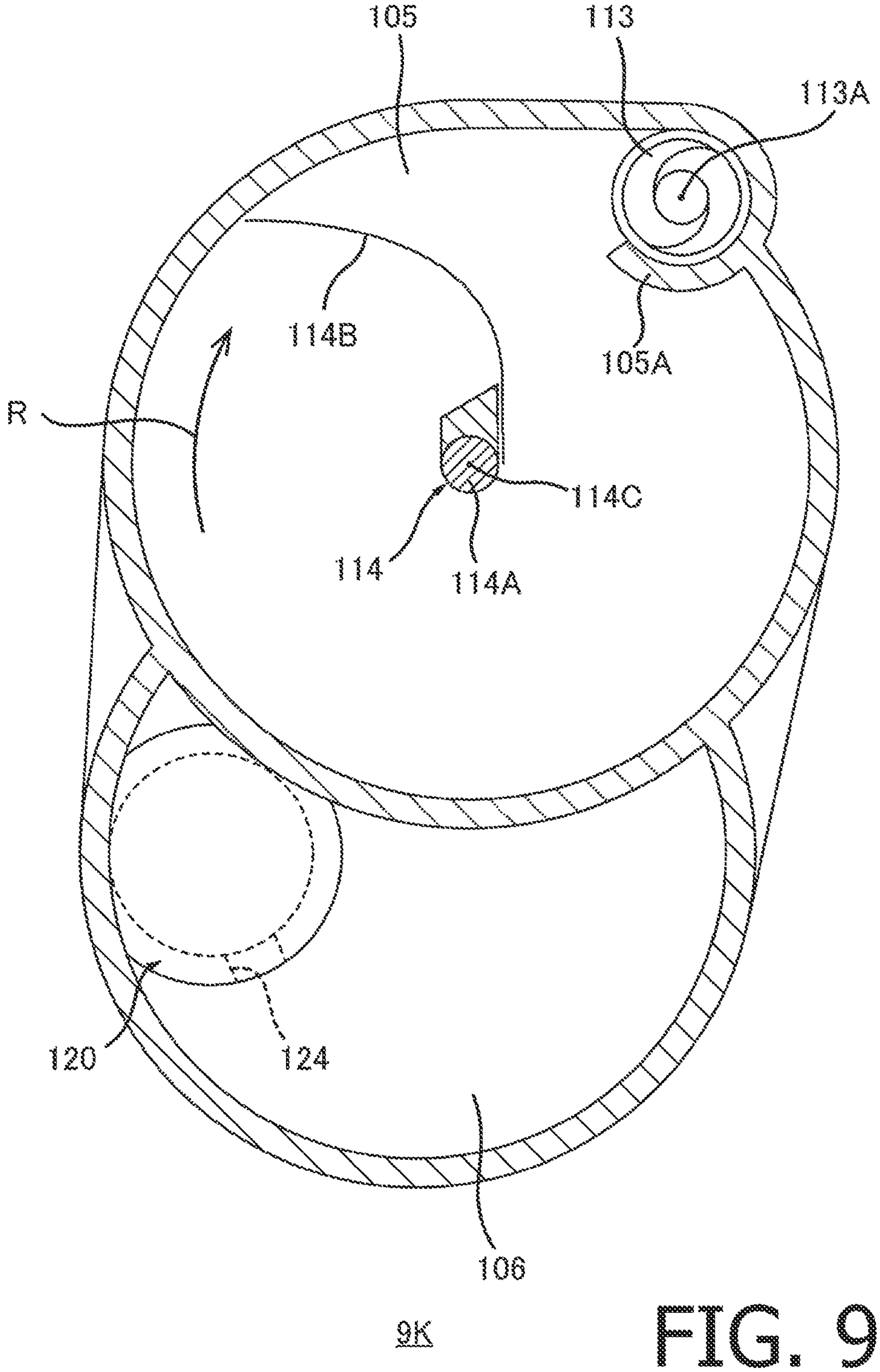
FIG. 9 is a cross-sectional view of one of toner cartridges according to the embodiment of the present disclosure viewed at a line E-E shown in FIG. 8.

Next, detailed configuration of the toner cartridge 9K will be described with reference to FIGS. 8 and 9. The toner cartridges 9K, 9Y, 9M, 9C are in a same structure; therefore, in the following description, the toner cartridge 9K will represent the structure of the toner cartridges 9K, 9Y, 9M, 9C, and description of the toner cartridges 9K, 9Y, 9M, 9C may be omitted.

The toner cartridge 9K is, while the toner cartridge 9K is attached to the main casing 2, extends in the axial direction. The toner cartridge 9K includes a first hopper 105 and a second hopper 106. The first hopper 105 and the second hopper 106 align along the first direction, which may be, for example, the vertical direction, while the toner cartridge 9K is attached to the main casing 2. The first hopper 105 may accommodate the toner to be supplied to the developing unit 13. The second hopper 106 may accommodate the toner collected from the photosensitive drum 15 by the cleaner 64. The second hopper 106 is, while the toner cartridge 9K is attached to the main casing 2, located at a lower position with respect to the first hopper 105.

3.1 Detailed Configuration of the First Hopper

The toner cartridge 9K further includes a supplying tube 109, a shutter 110, an auger 113, and an agitator 114.

The supplying tube 109 protrudes outward from the first hopper 105. The first hopper 105 includes a first outer surface S1 and a second outer surface S2. The second outer surface S2 is, while the toner cartridge 9K is attached to the main casing 2, located between the first outer surface S1 and the process cartridge 8K along the axial direction. The supplying tube 109 protrudes outward from the second outer surface S2 and extends in the axial direction while the toner cartridge 9K is attached to the main casing 2. The supplying tube 109 has a cylindrical shape, and an inner tubular room inside the supplying tube 109 is continuous with an inner room inside the first hopper 105. The supplying tube 109 has an opening 106, which is formed through a circumferential surface of the supplying tube 109. The opening 116 allows the toner in the supplying tube 109 to be discharged therefrom.

The shutter 110 may open and close the opening 116. The shutter 110 is movable between a closure position, in which the shutter 110 closes the opening 116, and an open position, in which the shutter 110 opens the opening 116. In particular, the shutter 110 is movable between the open position and the closure position along an extending direction of the supplying tube 109. In this regard, the shutter 110 is movable with respect to the supplying tube 109 between the open position and the closure position along the axial direction. The shutter 110 is urged by a spring 111 toward the closure position. Therefore, the shutter 110 tends to be located at the closure position while the toner cartridge 9K is separated from the main casing 2. The shutter 110 has a cylindrical shape and extends in the extending direction of the supplying tube 109. The shutter 110 covers a portion of the circumferential surface of the supplying tube 109. The shutter 110, while the shutter 110 is at the closure position, covers the opening 116. The shutter 110 is moved from the closure position to the open position, as the toner cartridge 9K is being attached to the main casing 2, by contact with an insertion tube 80B of a main supplier tube 80K, which will be described later in detail. Therefore, the shutter 110 is, while the toner cartridge 9K is attached to the main casing 2, placed at the open position. The shutter 110 in the open position is displaced from the opening 116 and does not cover the opening 116.

The auger 113 may supply the toner in the first hopper 105 to the developing unit 13. In particular, the auger 113 may convey the toner in the first hopper 105 to the opening 116. The auger 113 is arranged inside the first hopper 105 and inside the supplying tube 109. The auger 113 extends in the extending direction of the supplying tube 109. In this regard, the auger 113, while the toner cartridge 9K is attached to the main casing 2, extends in the axial direction. The auger 113 is, while the toner cartridge 9K is attached to the main casing 2, rotatable about an auger axis 113A, which extends in the axial direction.

The agitator 114 may stir the toner in the first hopper 105 and supply the toner in the first hopper 105 to the auger 113. The agitator 114 is arranged inside the first hopper 105. The agitator 114 is, while the toner cartridge 9K is attached to the main casing 2, located at a lower position with respect to the auger 113. The agitator 114 includes an agitator shaft 114A and a wing 114B. The agitator shaft 114 extends, while the toner cartridge 9K is attached to the main casing 2, in the axial direction. The agitator shaft 114A is, while the toner cartridge 9K is attached to the main casing 2, located at a lower position with respect to the auger 113. The agitator 114 is rotatable about the agitator shaft 114A. In particular, the agitator 114 is, while the toner cartridge 9K is attached to the main casing 2, rotatable in a rotating direction R about an agitator axis 114C, which extends in the axial direction. The wing 114 extends form the agitator shaft 114A and is rotatable together with the agitator shaft 114A. The wing 114B may contact a curved section 105A in the first hopper 105 as the agitator 114 rotates. The curved section 105A may reserve the toner to be supplied to the auger 113 by the agitator 114 therein. In this regard, the first hopper 105 includes the curved section 105A. The curved section 105A is located in the inner room inside the first hopper 105. The curved section 105A is, while the toner cartridge 9K is attached to the main casing 2, located at a lower position with respect to the auger 113 and at an upper position with respect to the agitator shaft 114A. The curved section 105A curves along a rotating direction of the auger 113. As the agitator 114 rotates in the rotating direction R, the toner in the first hopper 105 may be carried on top of the curved section 105A. Further, the toner reserved on top of the curved section 105A may be conveyed at the opening 116 by the auger 113.

3.2 Detailed Configuration of the Second Hopper

The toner cartridge 9K further includes an insertion portion 120 and a shutter 121.

In the insertion portion 120, while the toner cartridge 9K is attached to the main casing 2, inserted may be a main collector tube 96, which will be described later in detail. The insertion portion 120 is located inside the second hopper 106. The insertion portion 120 has a cylindrical shape and extends, while the toner cartridge 9K is attached to the main casing 2, in the axial direction. The insertion portion 120 is connected to a lateral wall of the second hopper 106 at one end thereof with regard to an extending direction of the insertion portion 120, i.e., the axial direction. The insertion portion 120 has an insertion inlet 120A and an opening 124. Through the insertion inlet 120A, the main collector tube 96K may be inserted in the insertion portion 120. The insertion inlet 120A is located in an area in the one end of the insertion portion 120 with regard to the extending direction of the insertion portion 120, i.e., the axial direction. The opening 124 may, while the toner cartridge 9K is attached to the main casing 2, allow the waste toner from the main collector tube 96K to pass there-through to be accepted in the insertion portion 120. The opening 124 is formed through a circumferential surface of the insertion portion 120. The opening 124 is continuous with an inner room inside the second hopper 160 and with an inner room inside the insertion portion 120. In other words, the inner room in the second hopper 160 and the inner room in the insertion portion 120 are continuous with each other through the opening 124. The opening 124 is, while the toner cartridge 9K is attached to the main casing 2, at least partly continuous with an opening 101 of the main collector tube 96K.

The shutter 121 may open and close the opening 124. The shutter 121 is located inside the insertion portion 120. The shutter 121 is movable with respect to the insertion portion 120 between a closure position, in which the shutter 121 closes the opening 124, and an open position, in which the shutter 121 opens the opening 124. In particular, the shutter 121 is movable between the open position and the closure position along the extending direction of the insertion portion 120. In this regard, the shutter 121 is movable with respect to the insertion portion 120 between the open position and the closure position along the axial direction. The shutter 121 is urged by a spring 122 toward the closure position. Therefore, the shutter 121 tends to be located at the closure position while the toner cartridge 9K is separated from the main casing 2. The shutter 121 has a cylindrical shape and extends in the extending direction of the insertion portion 120. The shutter 121 is moved from the closure position to the open position, as the toner cartridge 9K is being attached to the main casing 2, by contact with the main collector tube 96K, which will be described below. Therefore, the shutter 121 is, while the toner cartridge 9K is attached to the main casing 2, placed at the open position. The shutter 121 in the open position is displaced from the opening 124 and does not cover the opening 124.

4. Main Supplier Tubes and Main Collector Tubes

The image forming apparatus 1 includes, as shown in FIG. 10, a plurality of, e.g., four (4), main supplier tubes 80K, 80Y, 80M, 80C and a plurality of, e.g., four (4), main collector tubes 96K, 96Y, 96M, 96C.

4.1 Main Supplier Tubes

The main supplier tubes 80K, 80Y, 80M, 80C align along the aligning direction spaced apart from one another along the aligning direction. The main supplier tube 80K may, while the process cartridge 8K and the toner cartridge 9K are attached to the main casing 2, supply the toner from the toner cartridge 9K to the developing unit 13. Similarly, while the process cartridge 8Y and the toner cartridge 9Y, the process cartridge 8M and the toner cartridge 9M, and the process cartridge 8C and the toner cartridge 9C are attached to the main casing 2, respectively, the main supplier tubes 80Y, 80M, 80C may supply the toner from the toner cartridges 96Y, 96M, 96C, respectively, to the developing unit 13.

The main supplier tubes 80K, 80Y, 80M, 80C are in a same structure; therefore, in the following description, the main supplier tube 80K will represent the structure of the main supplier tubes 80K, 80Y, 80M, 80C, and description of the main supplier tubes 80Y, 80M, 80C may be omitted.

The main supplier tube 80K includes a conveyer tube 80A and an insertion tube 80B.

The conveyer tube 80A is for conveying the toner from the toner cartridge 9K toward the process cartridge 8K. The conveyer tube 80A extends, while the process cartridge 8K and the toner cartridge 9K are attached to the main casing 2, in a direction, in which the process cartridge 8K and the toner cartridge 9K align with each other. In this regard, the conveyer tube 80A extends in the axial direction while the process cartridge 8K and the toner cartridge 9K are attached to the main casing 2. For example, the conveyer tube 80A may extend in a horizontal direction. The conveyer tube 80A includes a first end portion E1 and a second end portion E2 with regard to the extending direction of the conveyer tube 80A, i.e., the axial direction. The second end portion E2 is separated apart from the first end portion E1 along the extending direction of the conveyer tube 80A. The second end portion E2 is connected with the toner conveyer tube 41 while the process cartridge 8K is attached to the main casing 2. The conveyer tube 80A has, as shown in FIG. 6, a second opening 82. In this regard, the main supplier tube 80K has the second opening 82. The second opening 82 is located in the second end portion E2 in the conveyer tube 80A with regard to the extending direction of the conveyer tube 80A. The second opening 82 is formed through a circumferential surface of the conveyer tube 80A. The second opening 82 coincides with the first opening 43 while the process cartridge 8K is attached to the main casing 2.

The image forming apparatus 1 further includes an auger 83 and a second shutter 90.

The auger 83 may convey the toner in the conveyer tube 80A toward the second opening 82. The auger 83 is located inside the conveyer tube 80A and extends in the extending direction of the conveyer tube 80A.

The second shutter 90 may open and close the second opening 82. The second shutter 90 is movable to rotate between a closure position, in which the second shutter 90 closes the second opening 82, and an open position, in which the second shutter 90 opens the second opening 82.

In particular, the second shutter 90 covers the circumferential surface of the conveyer tube 80A and is movable to rotate on the circumferential surface of the conveyer tube 80A between the open position and the closure position. The second shutter 90 is urged by a spring 91 (see FIG. 8) toward the closure position. Therefore, the second shutter 90 tends to be located at the closure position while the process cartridge 8K is separated from the image forming apparatus 1. The second shutter 90 includes a main part 90A and a protrusive part 90B. The main part 90A covers the circumferential surface of the conveyer tube 80A. The main part 90A has a cylindrical shape and extends in the axial direction. The main part 90A has an opening 90C. The opening 90C is formed through a circumferential surface of the main part 90A. The opening 90C at least partly coincides with the second opening 82 to be continuous with the second opening 82 while the second shutter 90 is at the open position. On the other hand, the opening 90C is displaced from the second opening 82 to be not continuous with the second opening 82 while the second shutter 90 is at the closure position. The protrusive part 90B may contact the main part 59 of the first shutter 55 while the process cartridge 8K is attached to the image forming apparatus 1. The protrusive part 90B protrudes outward in a radial direction of the main part 90A from the circumferential surface of the main part 90A. When the process cartridge 8K is being attached to the main casing 2, the protrusive part 90B contacting the main part 59 of the first shutter 55 may move the second shutter 90 from the closure position to the open position. Thus, the second shutter 90 is placed in the open position while the process cartridge 8K is attached to the image forming apparatus 1. Meanwhile, at a position between the conveyer tube 80A in the main supplier tube 80K and the second shutter 90, arranged are a second sealer 92A and a second sealer 92B. In this regard, the image forming apparatus 1 includes the second sealer 92A and the second sealer 92B. The second sealer 92A and the second sealer 92B may seal a gap between the conveyer tube 80A and the second shutter 90. The second sealer 92A is arranged to contact the circumferential surface of the conveyer tube 80A and may be adhered thereto by, for example, an adhesive agent. The second sealer 92A encloses the second opening 82. Meanwhile, the second sealer 92B is arranged to contact an inner circumferential surface of the main part 90A and may be adhered to the inner circumferential surface of the main part 90A by, for example, an adhesive agent. The second sealer 92B encloses the opening 90C. The second sealer 92B contacts the second sealer 92A and is slidable with respect to the second sealer 92A in a rotating direction of the second shutter 90.

In the insertion tube 80B, as shown in FIGS. 8 and 10, while the toner cartridge 9K is attached to the main casing 2, inserted is the supplying tube 109 of the toner cartridge 9K. With the second end portion E2 of the conveyer tube 80B connected with the toner conveyer tube 41, and with the supplying tube 109 inserted in the insertion tube 80B, the first hopper 105 is connected with the toner conveyer tube 41 through the main supplier tube 80K. The insertion tube 80B aligns with the first end portion E1 of the conveyer tube 80A along a radial direction of the conveyer tube 80A. The insertion tube 80B is connected with the first end portion E1 of the conveyer tube 80A. At a part where the insertion tube 80B and the conveyer tube 80A are connected with each other, formed is an opening 86. An inner tubular room in the insertion tube 80B is continuous with an inner tubular room inside the conveyer tube 80A through the opening 86. The insertion tube 80B includes a shutter 93.

The shutter 93 may open and close the opening 86. The shutter 93 is located inside the insertion tube 80B. The shutter 93 is movable between a closure position, in which the shutter 93 closes the opening 86, and an open position, in which the shutter 93 opens the opening 86. In particular, the shutter 93 is movable with respect to the insertion tube 80B between the open position and the closure position along an extending direction of the insertion tube 80B. The shutter 93 is urged by a spring 94 toward the closure position. Therefore, the shutter 93 tends to be located at the closure position while the toner cartridge 9K is separated from the main casing 2. The shutter 93 has a cylindrical shape and extends in the extending direction of the insertion tube 80B. The shutter 93 covers, while the shutter 93 is in the closure position, the opening 86. The shutter 93 is moved from the closure position to the open position, as the toner cartridge 9K is being attached to the main casing 2, by contact with the supplying tube 109. Therefore, the shutter 93 is, while the toner cartridge 9K is attached to the main casing 2, placed at the open position. The shutter 93 in the open position is displaced from the opening 86 and does not cover the opening 86.

4.2 Main Collector Tubes

The main collector tubes 90K, 90Y, 90M, 90C are located at a position lower than the main supplier tubes 80K, 80Y, 80M, 80C. The main collector tubes 90K, 90Y, 90M, 90C align along the aligning direction spaced apart from one another along the aligning direction. The main collector tube 90K may, while the process cartridge 8K and the toner cartridge 9K are attached to the main casing 2, collect the toner from the cleaner 64 of the process cartridge 8K into the second hopper 106 of the toner cartridge 9K. Similarly, while the process cartridge 8Y and the toner cartridge 9Y, the process cartridge 8M and the toner cartridge 9M, and the process cartridge 8C and the toner cartridge 9C are attached to the main casing 2, respectively, the main collector tube 90Y, 90M, 90C may collect the toner from each cleaner 64 of the process cartridges 8Y, 8M, 8C, respectively, into each second hopper 106 of the toner cartridges 9Y, 9M, 9C, respectively.

The main collector tubes 90K, 90Y, 90M, 90C are in a same structure; therefore, in the following description, the main collector tube 90K will represent the structure of the main collector tubes 90K, 90Y, 90M, 90C, and description of the main collector tubes 90Y, 90M, 90C may be omitted.

The main collector tube 96K extends, while the process cartridge 8K and the toner cartridge 9K are attached to the main casing 2, in the direction, in which the process cartridge 8K and the toner cartridge 9K align with each other. In this regard, the main collector tube 96K extends in the axial direction while the process cartridge 8K and the toner cartridge 9K are attached to the main casing 2. For example, the main collector tube 96K may extend in a horizontal direction. The main collector tube 96K includes a first end portion E11 and a second end portion E12 with regard to the extending direction of the main collector tube 96K, i.e., the axial direction. The second end portion E12 is separated apart from the first end portion E11 along the axial direction. The second end portion E12 is connected with the cleaner 64 in the process cartridge 8K while the process cartridge 8K is attached to the main casing 2. The first end portion E11 is connected with the second hopper 106 in the toner cartridge K while the process cartridge 8K is attached to the main casing 2. Thus, the second hopper 106 may be continuous with the cleaner 64 through the main collector tube 96K. The main collector tube 96K has a cylindrical shape. The main collector tube 96K has the opening 101 (see FIG. 6) and an opening 102. The opening 101 may accept the waste toner from the cleaner 64 through the waste toner conveyer tube 68 while the process cartridge 8K is attached to the main casing 2. The opening 101 is located in the second end portion E12 in the main collector tube 96K. The opening 101 is formed through a circumferential surface of the main collector tube 96K. Meanwhile, the opening 102 may, while the toner cartridge 9K is attached to the main casing 2, as shown in FIG. 8, allow the waste toner to be discharged at the second hopper 106 in the toner cartridge 9K. The opening 102 is located in the first end portion E11 in the main collector tube 96K. The opening 102 is formed through the circumferential surface of the main collector tube 96K.

The image forming apparatus 1 further includes an auger 97 (see FIG. 6), a shutter 98, and a shutter 103.

The auger 97 may, as shown in FIG. 6, convey the toner in the main collector tube 96K toward the opening 102. The auger 97 is located inside the main collector tube 96K and extends in the extending direction of the main collector tube 96K.

The shutter 98 may open and close the opening 101. The shutter 98 is movable to rotate between a closure position, in which the shutter 98 closes the opening 101, and an open position, in which the shutter 98 opens the opening 101.

In particular, the shutter 98 covers an outer circumferential surface the main collector tube 96K at the second end portion E12 and is movable to rotate on the circumferential surface of the main collector tube 96K between the open position and the closure position. The shutter 98 is urged by a spring 99 (see FIG. 8) toward the closure position. Therefore, the shutter 98 tends to be located at the closure position while the process cartridge 8K is separated from the image forming apparatus 1. The shutter 98 includes a main part 98A and a protrusive part 98B. The main part 98A covers the circumferential surface of the main collector tube 96K at the second end portion E12. The main part 98A has a cylindrical shape and extends in the extending direction of the main collector tube 96K. The main part 98A has an opening 98C. The opening 98C is formed through the circumferential surface of the main part 98A. The opening 98C at least partly coincides with the opening 101 to be continuous with the opening 101 while the shutter 98 is at the open position. On the other hand, the opening 98C is displaced from the opening 101 to be not continuous with the opening 101 while the shutter 98 is at the closure position. The protrusive part 98B may contact the main part 75 of the cleaner shutter 71 while the process cartridge 8K is attached to the image forming apparatus 1. The protrusive part 98B protrudes outward in a radial direction of the main part 98A from the circumferential surface of the main part 98A. When the process cartridge 8K is being attached to the main casing 2, the protrusive part 98B contacting the main part 75 of the cleaner shutter 71 may move the shutter 98 from the closure position to the open position. Thus, the shutter 98 is placed in the open position while the process cartridge 8K is attached to the image forming apparatus 1. Meanwhile, at a position between the main collector tube 96K and the shutter 98, arranged are a sealer 100A and a sealer 100B. The sealer 100A and the sealer 100B may seal a gap between the main collector tube 96K and the shutter 98. The sealer 100A is arranged to contact the circumferential surface of the main collector tube 96K and may be adhered thereto by, for example, an adhesive agent. The sealer 100A encloses the opening 101. Meanwhile, the sealer 100B is arranged to contact an inner circumferential surface of the main part 98A and may be adhered to the inner circumferential surface of the main part 98A by, for example, an adhesive agent. The sealer 100B encloses the opening 98C. The sealer 100B contacts the sealer 100A and is slidable with respect to the sealer 100A along a rotating direction of the shutter 98.

The shutter 103 may, as shown in FIG. 8, open and close the opening 102. The shutter 103 is movable between a closure position, in which the shutter 103 closes the opening 102, and an open position, in which the shutter 103 opens the opening 102. In particular, the shutter 103 is movable with respect to the main collector tube 96K between the open position and the closure position along the extending direction of the main collector tube 96K. The shutter 103 is urged by a spring 104 toward the closure position. Therefore, the shutter 103 tends to be located at the closure position while the toner cartridge 9K is separated from the main casing 2. The shutter 103 has a cylindrical shape and extends in the extending direction of the main collector tube 96K. The shutter 103 covers the circumferential surface of the main collector tube 96K at the second end portion E12. The shutter 103 covers, while the shutter 103 is in the closure position, the opening 102. The shutter 103 is moved from the closure position to the open position, as the toner cartridge 9K is being attached to the main casing 2, by contact with the second hopper 106 in the toner cartridge 9K. Therefore, the shutter 103 is, while the toner cartridge 9K is attached to the main casing 2, placed at the open position. The shutter 103 in the open position is displaced from the opening 102 and does not cover the opening 102.

5. Benefits

According to the image forming apparatus 1 described above, as shown in FIGS. 3 and 4, the developing unit 13 is supported by the drum unit 12 by the circumferential surface of the toner conveyer tube 41 contacting the drum unit 12. Specifically, with the circumferential surface of the toner conveyer tube 41 contacting the inner surface of the insertion hole 51, the developing unit 13 is supported by the drum unit 12.

Therefore, with regard to the direction of contact, along which the toner conveyer tube 41 and the drum unit 12 contact each other, the toner conveyer tube 41 may not move with respect to the drum unit 12.

In this regard, the first opening 43 is maintained steady with regard to the direction of contact between the toner conveyer tube 41 and the drum unit 12. Meanwhile, the toner conveyer tube 41 and the drum unit 12 may slide relatively to each other; therefore, the developing unit 13 may pivot with respect to the drum unit 12.

In this way, the first opening 43 may be restrained from moving together with the developing unit 13, and leakage of the toner, which may be caused by if the first opening 43 is movable, may be prevented.

Thus, with the less complicated configuration, the toner may be prevented from leaking between the toner cartridge 9K and the developing unit 13.

In other words, the developing unit 13 may pivot stably with the pivot axis thereof maintained steady with respect to the drum unit 12. Therefore, while the developing unit 13 pivots with respect to the drum unit 12, the first opening 43 may be prevented from deviating in a direction orthogonal to the pivot axis. In other words, while the developing unit 13 pivots with respect to the drum unit 13, the first opening 43 may be restrained from moving closer to or farther from the second opening 82. In this regard, leakage of the toner through the first opening 43, which may be caused is the first opening 43 is movable closer to or farther from the second opening 82, may be restrained.

Meanwhile, as the circumferential surface of the toner conveyer tube 41 is pivotably supported by the drum unit 12, the developing unit 13 may pivot stably with respect to the drum unit 12. In this condition, the developing unit 13 being urged by the spring 47 may maintain the developer roller 18 at a correct position, e.g., a contacting position, with respect to the photosensitive drum 18.

6. More Examples

Although an example of carrying out the present disclosure have been described, those skilled in the art may recognize that there are numerous variations and permutations of the image forming apparatus and the process cartridge that fall within the spirit and scope of the invention as set forth in the appended claims. It may be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

Next, more examples modified from the embodiment described above will be described with reference to FIGS. 11-15. In the modified configurations described below, the benefits that are achievable by the embodiment described above may be similarly achieved.

6.1 First Modified Example

Figure 11:
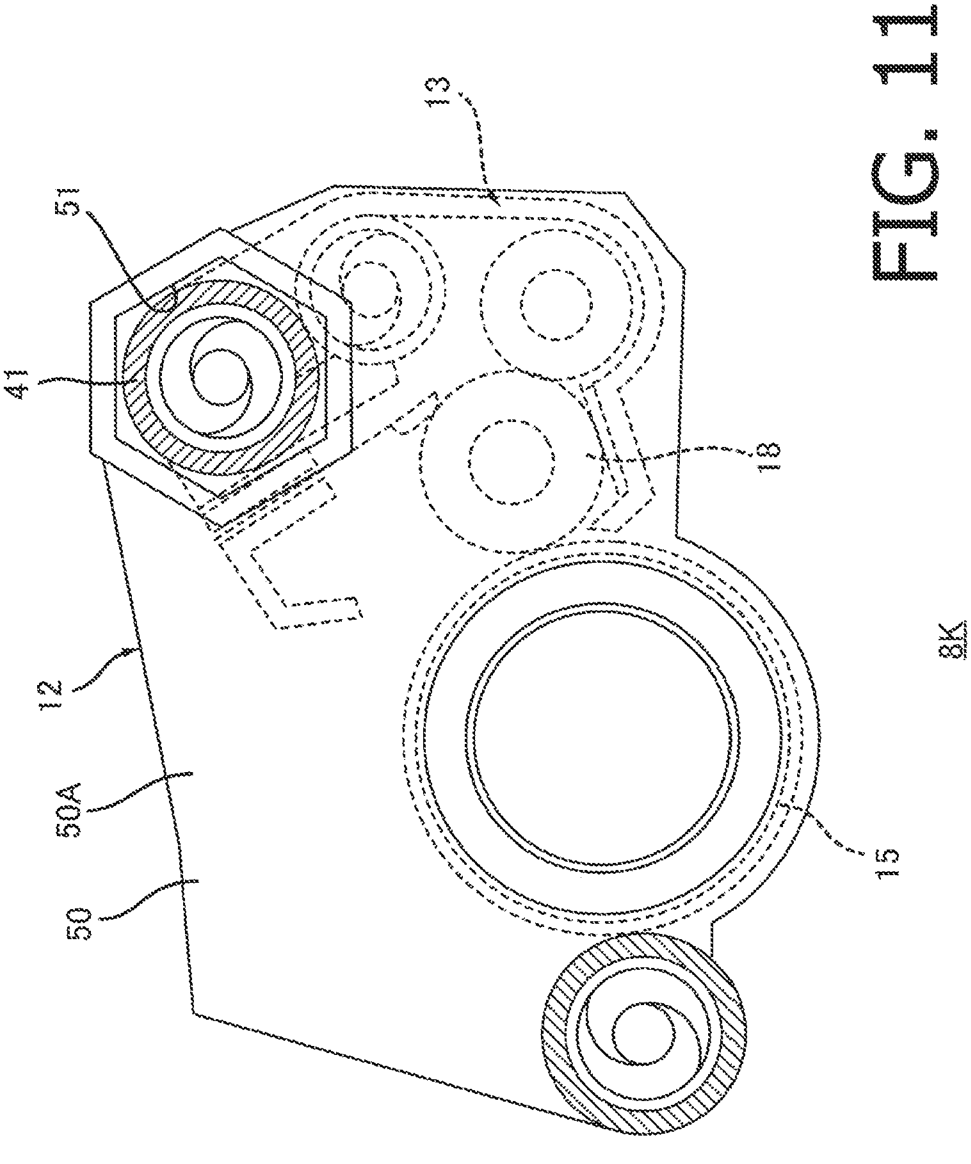
FIG. 11 is a cross-sectional view of a toner cartridge according to a first modified example of the embodiment of the present disclosure.

The form of the insertion hole 51 may not necessarily be limited to the round shape as described above, but the insertion hole 51 may have a polygonal shape in a cross section as long as the insertion hole 51 may surround the toner conveyer tube 41. For example, the insertion hole 51 may have a hexagonal shape, as shown in FIG. 11, or a square shape, or an octagonal shape, in a cross section.

6.2 Second Modified Example

Figure 12:
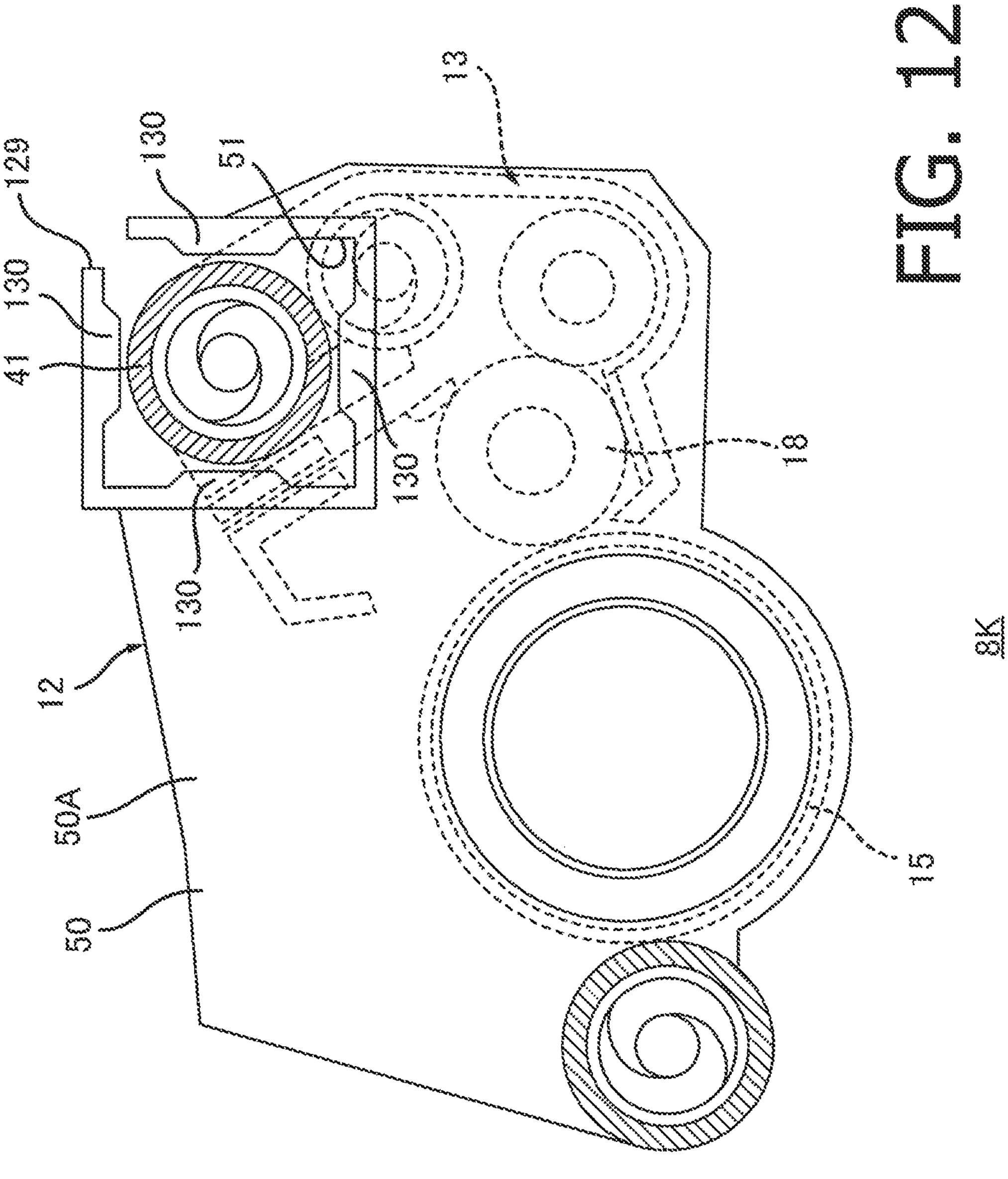
FIG. 12 is a cross-sectional view of a toner cartridge according to a second modified example of the embodiment of the present disclosure.

The shape of the insertion hole 51 in a cross section may not necessarily be limited to a closed shape that surrounds the circumferential surface of the toner conveyer tube 41 entirely but may be partly open, as shown in FIG. 12.

6.3 Third Modified Example

Figure 13:
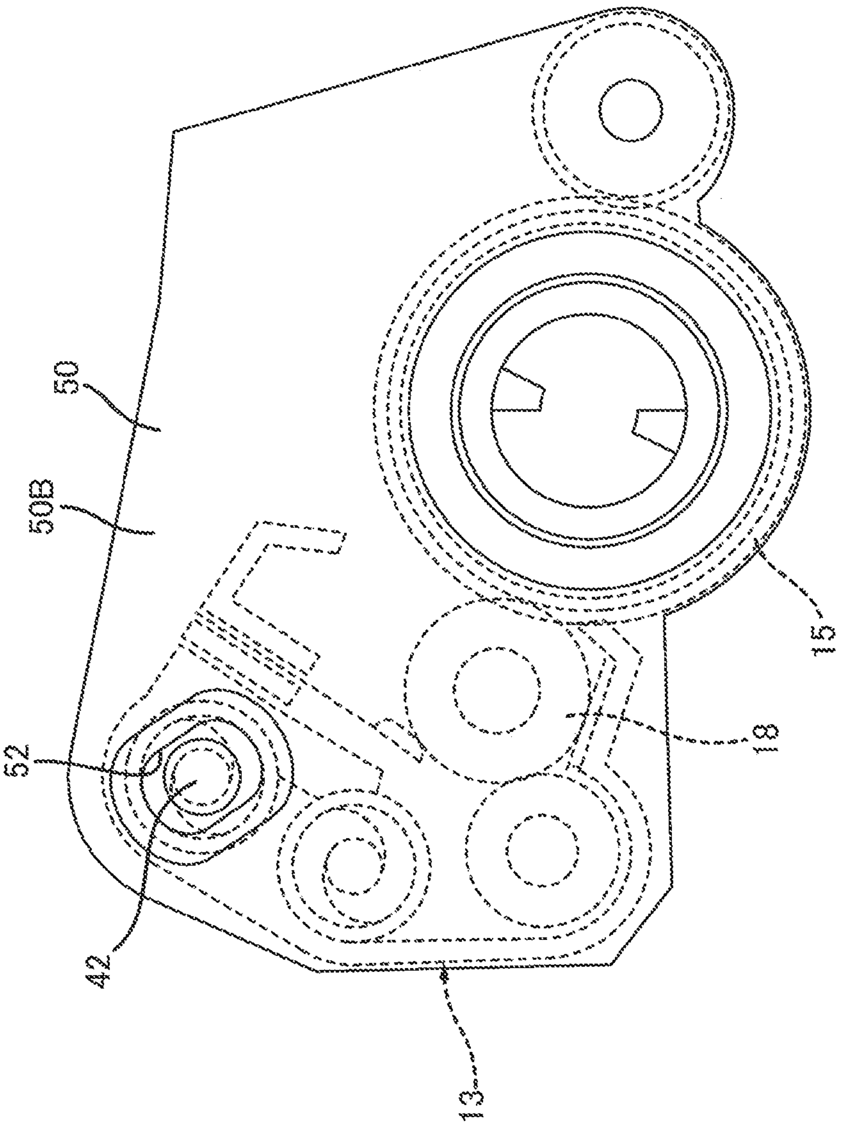
FIG. 13 is a cross-sectional view of a toner cartridge according to a third modified example of the embodiment of the present disclosure.

Meanwhile, the form of the insertion hole 52 may not necessarily be limited to the round shape as described above, but the insertion hole 52 may have, for example, as shown in FIG. 13, an elongated shape including one end closer to the photosensitive drum 15 and the other end farther from the photosensitive drum 15 in a view along the second direction. With the insertion hole 52 in the modified shape, an amount of nipping pressure between the photosensitive drum 15 and the developer roller 18 may be maintained preferably even if the photosensitive drum 15 may behave eccentrically.

6.4 Fourth Modified Example

Figure 14:
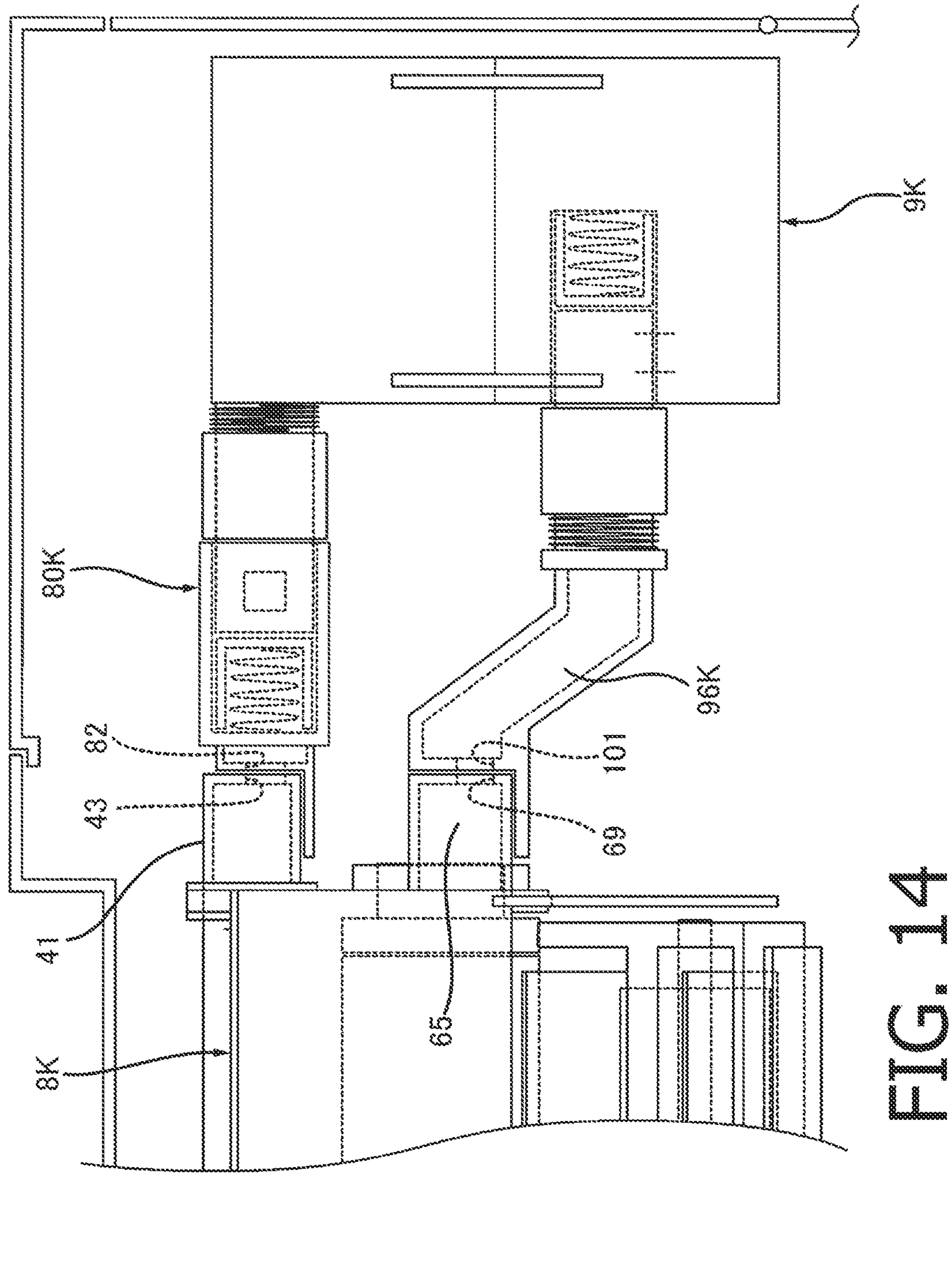
FIG. 14 is a cross-sectional view of a toner cartridge according to a fourth modified example of the embodiment of the present disclosure.

The position of the first opening 43 may not necessarily be limited to the circumferential surface of the toner conveyer tube 41 as described above but may be formed, for example, as shown in FIG. 14, through a lateral surface of the toner conveyer tube 41 at an axial end. In this position, the first opening 43 may be formed through the axial end lateral surface of the toner conveyer tube 41 along the axial direction.

While the first opening 43 may be formed through the axial end lateral surface of the toner conveyer tube 41, the second opening 82 may be formed through an axial end lateral surface of the main supplier tube 80K to coincide with the first opening 43 along the axial direction.

Meanwhile, the opening 69 in the waste toner conveyer tube 68 may be formed through an axial end lateral surface of the waste toner conveyer tube 68 as well, and the opening 101 in the main collector tube 96K may be formed through an axial end lateral surface of the main collector tube 96K.

6.5 Fifth Modified Example

Figure 15:
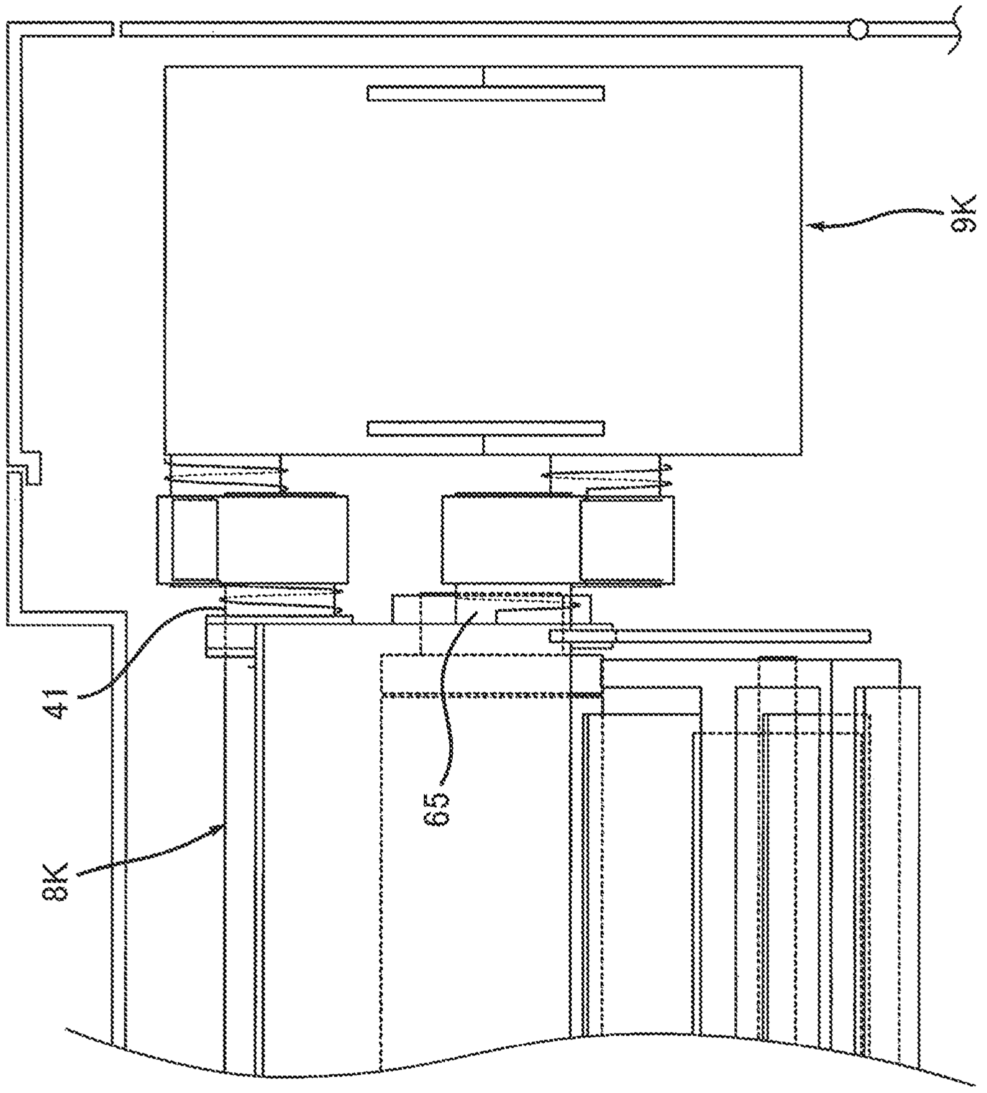
FIG. 15 is a cross-sectional view of a toner cartridge according to a fifth modified example of the embodiment of the present disclosure.

The image forming apparatus 1 may not necessarily include the main supplier tube 80K or the main collector tube 96, as shown in FIG. 15. Without the main supplier tube 80K and the main collector tube 96, the process cartridge 8K and the toner cartridge 9K may be connected with each other directly.

What is claimed is:

1. An image forming apparatus comprising:

a main casing having a first casing-opening, the main casing comprising:

a first side wall, a second side wall spaced apart from the first side wall in a predetermined direction, and a top cover movable between a cover-open position, in which the top cover opens the first casing-opening, and a cover-closure position, in which the top cover closes the first casing-opening;

a process cartridge detachably attachable to the main casing between the first side wall and the second side wall through the first casing-opening, the process cartridge having a photosensitive drum and a developing roller;

an LED array attached to the top cover, the LED array being at a first position where the LED array is capable of emitting light at the photosensitive drum to form an electrostatic latent image on the photosensitive drum when the top cover is at the cover-closure position, the LED array being at a second position where the LED array is spaced away from the photosensitive drum when the top cover is at the cover-open position; and a toner cartridge detachably attachable to and detachable from the main casing through a second casing-opening in a direction parallel to the predetermined direction, wherein the main casing further has:

a main supplier tube configured to transfer toner from the toner cartridge to the developing roller, the main supplier tube having a first opening, and a first shutter movable between a first closure position, in which the first shutter closes the first opening, and a first open position, in which the first shutter opens the first opening.

2. The image forming apparatus according to claim 1, wherein the main supplier tube has:

a second opening, and a second shutter movable between a second closure position, in which the second shutter closes the second opening, and a second open position, in which the second shutter opens the second opening.

3. The image forming apparatus according to claim 2, wherein the main supplier tube further has:

a conveyer tube connectable with the process cartridge, and an insertion tube connectable with the toner cartridge, and the conveyer tube and the insertion tube are connected through the first opening.

4. The image forming apparatus according to claim 3, wherein, when the toner cartridge is attached to the main casing, a part of the toner cartridge is inserted in the insertion tube and moves the first shutter to the first open position.

5. The image forming apparatus according to claim 4, wherein the toner cartridge has a supplying tube extending in an attachable direction, the attachable direction being a direction, in which the toner cartridge is attachable to the main casing, and the supplying tube is the part of the toner cartridge.

6. The image forming apparatus according to claim 5, wherein the toner cartridge further has a third shutter, the third shutter being movable between a third closure position, in which the third shutter closes a third opening, and a third open position, in which the third shutter opens the third opening.

7. The image forming apparatus according to claim 6, wherein the third shutter is movable in the attachable direction, and when the toner cartridge is being attached to the main casing, the third shutter is moved by the insertion tube to the third open position.

8. The image forming apparatus according to claim 3, wherein the second shutter is movable to rotate on a circumferential surface of the conveyer tube, and when the process cartridge is being attached to the main casing, the second shutter contacts the process cartridge and is moved by the process cartridge from the second closure position to the second open position.

9. The image forming apparatus according to claim 1, wherein the first side wall has the second casing-opening.

10. The image forming apparatus according to claim 1, wherein, when the toner cartridge and the process cartridge are attached to the main casing, the toner cartridge and the process cartridge align in the predetermined direction.

11. The image forming apparatus according to claim 1, wherein the main casing comprises a side cover movable between a side-open position, in which the side cover opens the second casing-opening, and a side-closure position, in which the side cover closes the second casing-opening.

* * * * *